(12) United States Patent
Israni et al.

(10) Patent No.: US 7,031,983 B2
(45) Date of Patent: *Apr. 18, 2006

(54) METHOD AND SYSTEM FOR USING REAL-TIME TRAFFIC BROADCASTS WITH NAVIGATION SYSTEMS

(75) Inventors: Vijaya S. Israni, Hoffman Estates, IL (US); Robert Fernekes, Cary, IL (US); Richard A. Ashby, Blue River, WI (US); David Lampert, Highland Park, IL (US); John M. Jaugilas, Lombard, IL (US)

(73) Assignee: Navteq North America, LLC, Chicago, IL (US)

( * ) Notice: Subject to any disclaimer, the term of this patent is extended or adjusted under 35 U.S.C. 154(b) by 347 days.

This patent is subject to a terminal disclaimer.

(21) Appl. No.: 10/196,476

(22) Filed: Jul. 16, 2002

(65) Prior Publication Data

US 2002/0194170 A1    Dec. 19, 2002

Related U.S. Application Data

(63) Continuation of application No. 09/196,409, filed on Nov. 19, 1998, now Pat. No. 6,438,561.

(51) Int. Cl.
*G06F 17/30* (2006.01)

(52) U.S. Cl. ........................... 707/104.1; 707/3

(58) Field of Classification Search ............ 707/1, 707/2, 3, 4, 100, 104.1, 102; 340/905, 995.19; 342/357.13; 455/186.1; 701/26, 117, 200, 701/201, 202; 705/6
See application file for complete search history.

(56) References Cited

U.S. PATENT DOCUMENTS 4,888,698 A    12/1989    Driessen et al. ............ 701/200

(Continued)

FOREIGN PATENT DOCUMENTS

EP    0 838 663 A2    4/1998
EP    0 871 010 A2    10/1998

OTHER PUBLICATIONS

Klingenberg et al., Location Referencing Systems for Dynamic Route Guidance Applications, 1993 IEEE, pp. 441-444.*

(Continued)

*Primary Examiner*—Apu M. Mofiz
(74) *Attorney, Agent, or Firm*—Frank J. Kozak; Jon D. Shutter; Grace L. O'Brien

(57) ABSTRACT

A system and method are disclosed that allow a navigation system that uses a geographic database to also use the data in traffic messages broadcast by a traffic broadcast system. One aspect of a present system and method includes the formation, storage, and use of location reference data records in a geographic database used by a navigation system. These location reference data records identify certain other kinds of data records that represent physical geographic features, such as data records that represent segments of roads, as being associated with certain location reference numbers. These location reference records may be included in a geographic database installed in the vehicle or may be provided to vehicles via a wireless communication link. Another aspect of a present system and method includes the formation, storage, and use of one or more indices that relate location reference numbers used by a traffic broadcast system to location reference records in a geographic database used by the navigation system. Another aspect of a present system and method is the formation, storage, and use of data that identify, for each location reference number, the immediately previous and the immediately next location reference number. Still another aspect of a present system and method includes the programming, and methods of use thereof, that query the geographic database and return the data entities associated with certain identified location reference numbers.

20 Claims, 14 Drawing Sheets

U.S. PATENT DOCUMENTS

| | | | |
|---|---|---|---|
| 4,907,159 A | 3/1990 | Mauge et al. | 701/117 |
| 5,173,691 A | 12/1992 | Sumner | 340/905 |
| 5,182,555 A * | 1/1993 | Sumner | 340/905 |
| 5,592,665 A | 1/1997 | Lahaije | 707/4 |
| 5,712,632 A | 1/1998 | Nishimura et al. | 340/995.19 |
| 5,784,691 A | 7/1998 | Ruhl | 455/186.1 |
| 5,933,094 A | 8/1999 | Goss et al. | 340/905 |
| 5,940,803 A | 8/1999 | Kanemitsu | 705/6 |
| 5,974,419 A | 10/1999 | Ashby | 707/100 |
| 5,987,382 A | 11/1999 | Weishaupt et al. | 701/211 |
| 6,038,559 A | 3/2000 | Ashby et al. | 707/4 |
| 6,058,390 A | 5/2000 | Liaw et al. | 707/2 |
| 6,101,443 A | 8/2000 | Kato et al. | 701/210 |
| 6,232,917 B1 | 5/2001 | Baumer et al. | 342/357.13 |
| 6,438,561 B1 * | 8/2002 | Israni et al. | 707/104.1 |
| 6,633,808 B1 | 10/2003 | Schulz et al. | 701/117 |

OTHER PUBLICATIONS

Hoffman, Steve and Stewart, Chares, "Text-based Routing: An Affordable Way Ahead?", Proceedings of the IEEE-IEE Vehicle Navigation & Information System Conference, Ottawa, Canada—VNIS 1993.

* cited by examiner

METHOD AND SYSTEM FOR USING REAL-TIME TRAFFIC BROADCASTS WITH NAVIGATION SYSTEMS

REFERENCE TO RELATED APPLICATIONS

The present application is a continuation of Ser. No. 09/196,409, filed Nov. 19, 1998 now U.S. Pat. No. 6,438,561 the entire disclosures of the aforementioned documents are incorporated herein by reference.

BACKGROUND OF THE INVENTION

The present invention relates to a system and method for using real-time broadcasts of traffic and road conditions in a navigation system, and more particularly, the present invention relates to a system and method that facilitates and implements the use and coordination of traffic broadcast data in a navigation system that uses a geographic database.

In some regional and metropolitan areas and countries, systems have been implemented that broadcast up-to-the-minute reports of traffic and road condition information. These systems broadcast traffic and road condition information on a continuous, periodic, or frequently occurring basis. These broadcasts can be received by receivers installed on-board vehicles that travel in the region. The on-board receivers decode the broadcast reports and make the information in the reports available to the vehicle driver.

These traffic report broadcast systems have several advantages over the simple broadcasting of traffic reports over radio stations. For example, with these traffic broadcasting systems, a driver can obtain the report more quickly. The driver does not have to wait until a radio station broadcasts a traffic report. Another advantage of these traffic broadcasting systems is that the driver does not have to listen to descriptions of traffic conditions for areas remote from his or her location. Another advantage of traffic broadcast systems is that more detailed and possibly more up-to-date information can be provided.

In these types of systems, the traffic information that is broadcast conforms to one or more pre-established specifications or formats. These specifications or formats are used by the on-board receivers in the vehicles that travel in the region to decode the traffic report messages.

One system for broadcasting real-time traffic and road conditions is the Radio Data System-Traffic Message Channel ("RDS-TMC"). The RDS-TMC system is used in some European countries. The RDS-TMC system is described in various publications, including "Radio Data System, CENELEC END50067:1996,Specification of the Radio Data System." The RDS-TMC system broadcasts traffic messages to vehicles using an FM station data channel. RDS-TMC messages are broadcast regularly or at varying intervals depending on the priority of the events. Similar or identical systems are being used or are being planned in other countries and regions.

For purposes of identifying locations of traffic congestion, the traffic and road condition broadcast systems in use today, as well as those planned for the future, assign codes to locations in a covered region. For example, in the RDS-TMC system, location reference codes are assigned to specific locations along roads in a covered geographic region. The locations may be intersections, interchanges, or portions of roads. Then, data messages are broadcast identifying traffic conditions relating to these locations. In general, these locations relate to heavily traveled roads, such as expressways and main roads.

Another, separate technology that has developed to assist drivers is the vehicle navigation system. Vehicle navigation systems provide various navigating features to drivers of vehicles, as well as others. The features provided by a vehicle navigation system differ from those provided by a traffic broadcast system. For example, a navigation system can calculate a specific route for a driver. The route calculated for the driver can begin at any street location in a covered geographic area and have a destination located at any other street location in the covered geographic region. The vehicle navigation system may also provide route guidance to the driver. The route guidance function can also be specific to the route calculated for the driver. The route guidance function may provide maneuvering instructions, audibly or visually, to the driver as the route is being followed. The navigation system may also provide other features, such as finding one or more destinations of a particular type within a given search area, such as all the Italian restaurants within two miles of a present position of the vehicle. In order to provide these kinds of functions, the navigation system uses a detailed geographic database, either located in the vehicle or accessible over a wireless communication link.

Both traffic broadcast systems and navigation systems can provide drivers with valuable features. However, even additional useful features could be provided if the data in the traffic broadcast reports could be used in conjunction with the navigation system features. For example, it would be advantageous if the data in the traffic messages could be utilized when calculating a route using the route calculation function in the navigation system. Unfortunately, the data in the reports broadcast by traffic broadcast systems, such as the RDS-TMC system, do not relate to the data used by the navigation system. For example, the location numbers assigned by the traffic broadcast system authorities, do not directly relate to any physical feature represented by the data records in the geographic database used by a navigation system.

Accordingly, there exists a need for using broadcast traffic reports in conjunction with a vehicle navigation system that uses a geographic database.

SUMMARY OF THE INVENTION

To address the above concerns, a system and method are provided that allow a navigation system that uses a geographic database to also use the data in traffic messages broadcast by a traffic broadcast system. One aspect of a present embodiment includes the formation, storage, and use of location reference data records in a geographic database used by a navigation system. These location reference data records identify certain other kinds of data records that represent physical geographic features, such as data records that represent segments of roads, as being associate with certain location reference numbers. These location reference data records may be included in a geographic database installed in the vehicle or may be provided to vehicles via a wireless communication link.

Another aspect of a present embodiment includes the formation, storage, and use of one or more indices that relate location reference numbers used by a traffic broadcast system to location reference data records in a geographic database used by the navigation system.

Another aspect of a present embodiment is the formation, storage, and use of location reference data records in parcels.

Still another aspect of a present embodiment is the formation, storage, and use of data that identifies, for each location reference number, the immediately previous and the immediately next location reference number.

Still another aspect of a present embodiment includes the programming, and methods of use thereof, that query the geographic database and return the data entities associated with certain identified location reference numbers.

Another aspect of a present embodiment is the ability to support multiple different types of traffic message systems using a geographic database.

Another aspect of a present embodiment includes a geographic database that supports use of real time traffic data that are transmitted to a navigation application that uses the geographic database, wherein the means by which the real time traffic data are transmitted include forms of wireless transmission, such as broadcasting and direct transmission, as well as forms of non-wireless transmission, such as telephone and data lines.

DETAILED DESCRIPTION OF THE PRESENTLY PREFERRED EMBODIMENTS

I. Traffic Broadcast System—Overview

Figure 1:
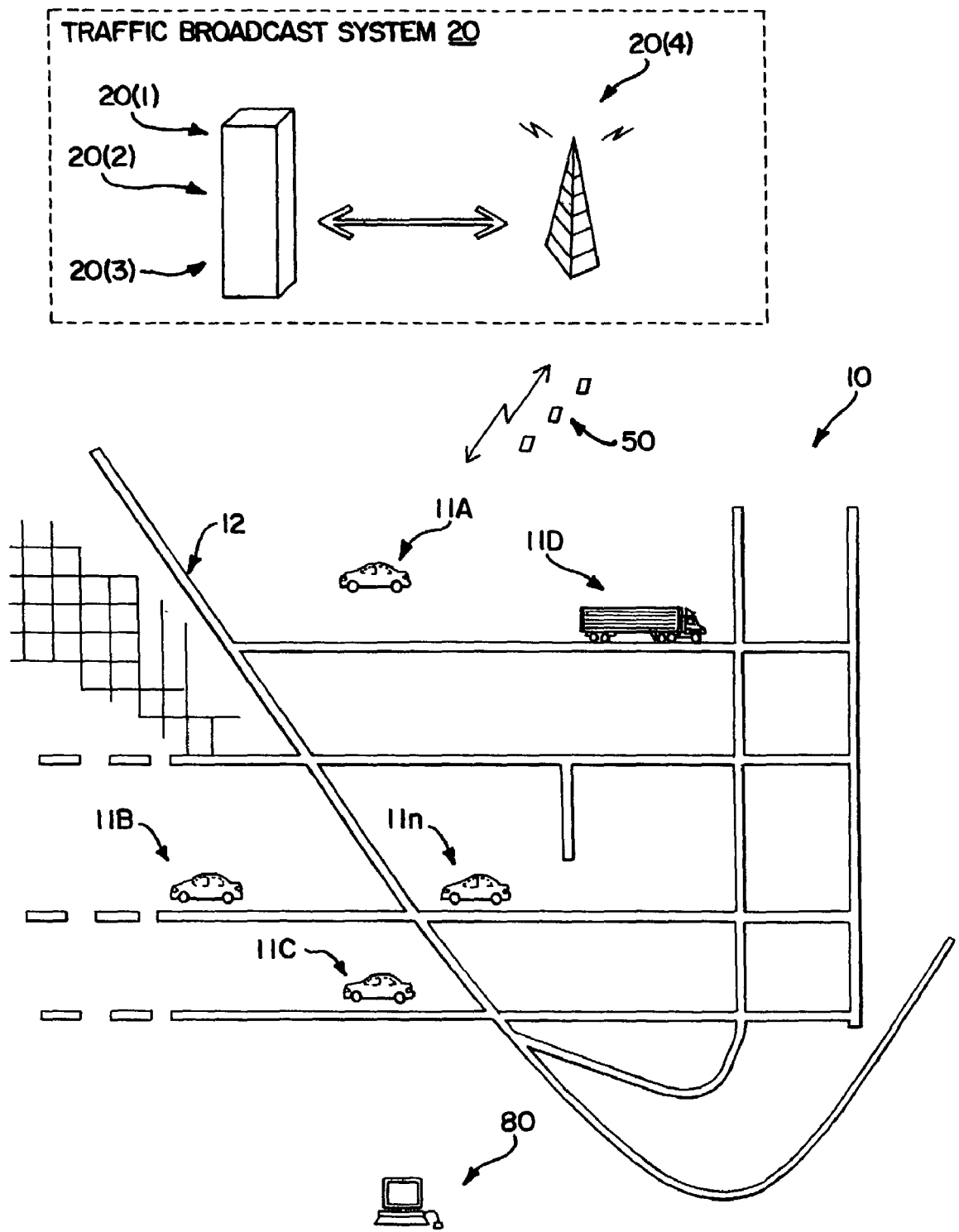
FIG. 1 is diagram illustrating components of a traffic broadcast system in a geographic region.

FIG. 1 is diagram illustrating a region 10. The region 10 may be a metropolitan area, such as the New York metropolitan area, the Los Angeles metropolitan area, or any other metropolitan area. Alternatively, the region 10 may be a state, province, or country, such as California, Illinois, France, England, or Germany. Alternatively, the geographic region 10 can be combination of one or more metropolitan areas, states, countries and so on. Located in the region 10 is a road network 12.

A traffic broadcast system 20 is located in the region 10. The traffic broadcast system 20 broadcasts data 50 regarding the traffic and road conditions in the region 10. The traffic broadcast system 20 may be operated by a government organization or may be privately operated. In one embodiment, the traffic broadcasting system 20 conforms to the RDS (Radio Data System) standard, although alternative systems can be used.

Vehicles 11(A), 11(B), 11(C) . . . 11(n) travel on the road network 12 in the region 10. The vehicles 11 may include cars or trucks. Some or all of the vehicles 11 include suitable equipment that enables them to receive the traffic and road condition data broadcast by the traffic broadcast system 20.

The data 50 broadcast from the traffic broadcast system 20 may also be received and used in systems that are not installed in vehicles (e.g., "non-vehicles 80"). These non-vehicles 80 may include workstations, personal computers, personal digital assistants, networks, pagers, televisions, radio receivers, telephones, and so on. The non-vehicle 80 that receive the data 50 may obtain them in the same manner as the vehicles, i.e., by broadcast. Alternatively, the non-vehicles 80 may receive the data 50 by other means, such as over telephone lines, over the Internet, via cable, and so on. The systems in the vehicles 11 or in the non-vehicles 80 that receive the traffic data 50 may include various different platforms.

Figure 2:
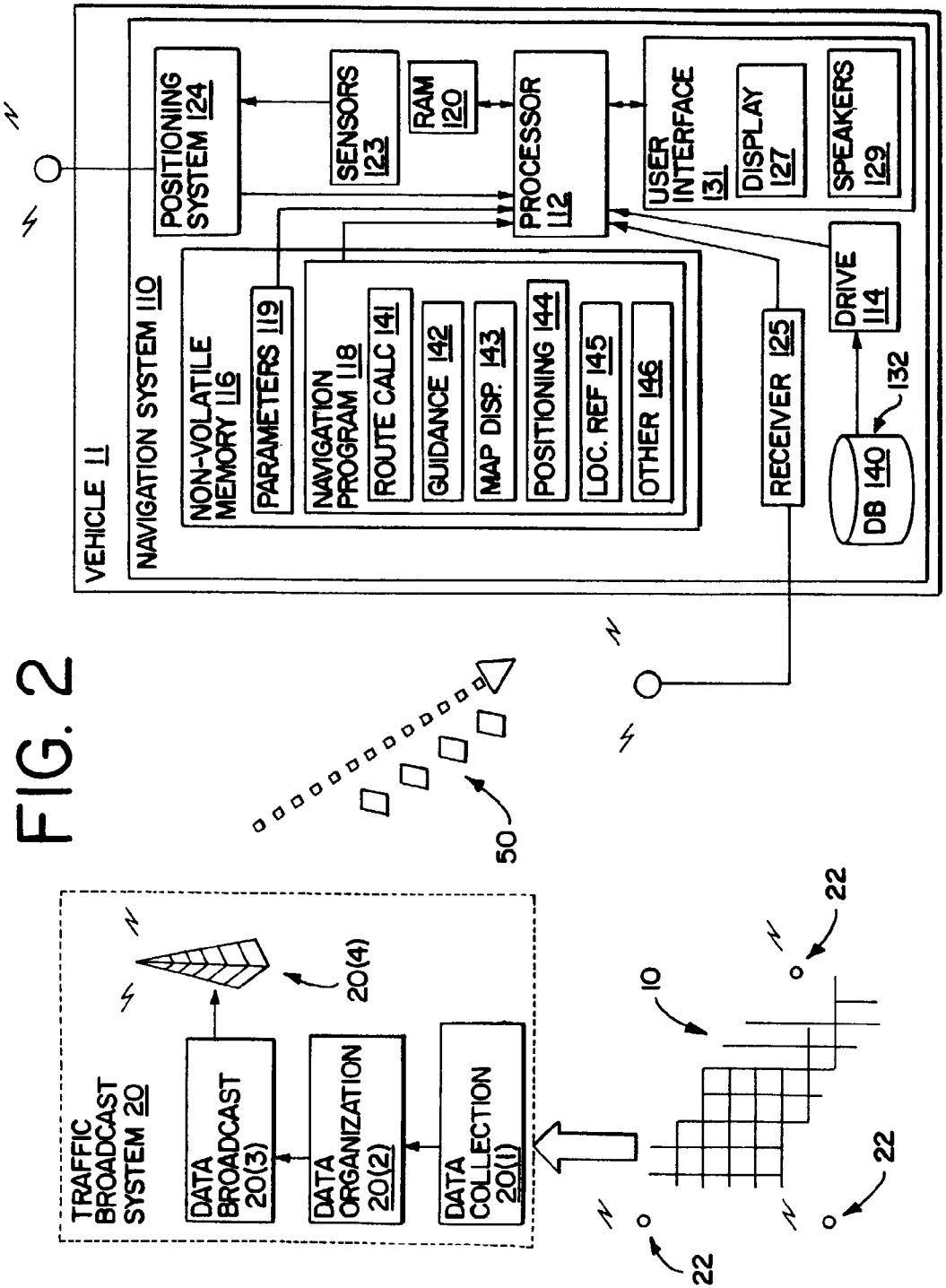
FIG. 2 is a block diagram illustrating components of the traffic broadcast system and one of the vehicles with an on-board navigation system, as shown in FIG. 1.

FIG. 2 shows diagrammatically the components of the traffic information broadcast system 20 and one of the vehicles 11 in FIG. 1. The traffic information broadcast system 20 provides for the collection of data relating to traffic and road conditions, the analysis and organization of these collected data, the formatting of the analyzed data into traffic messages, and the transmission of these traffic messages to the vehicles 11 in the region 10 on a regular and continuing basis.

The traffic broadcast system 20 uses various means 22 to obtain information about traffic and road conditions. These means 22 may include sensors located in or near the roads in the road network 12, aerial sensors, sensors in vehicles 11, radar, as well as other technologies.

The traffic broadcast system 20 includes equipment and programming 20(1) for collecting the data relating to traffic and road conditions in the region 10 from the various sensors 22. This equipment and programming 20(1) includes, for example, various communications links (including wireless links), receivers, data storage devices, programming that saves the collected data, programming that logs data collection times and locations, and so on. The traffic broadcast system 20 includes equipment and programming 20(2) for assembling, organizing, analyzing and formatting the collected traffic and road condition data. This programming and equipment 20(2) includes storage devices, programming that statistically analyzes the collected data for potential errors;

programming that organizes the collected data, programming that uses the data to prepare messages in one or more appropriate predetermined formats. The traffic broadcast system 20 also includes suitable equipment and programming 20(3) for broadcasting the data. The equipment and programming 20(3) includes interfaces to transmitters, programming that communicates formatted messages at regular intervals to the transmitters, and so on. The traffic broadcast system 20 also includes transmission equipment 20(4). This equipment 20(4) may comprise one or more FM transmitters, including antennas, or other wireless transmitters. This equipment 20(4) provides for broadcasting the formatted messages as traffic and road condition data 50 throughout the region 10. The broadcasting equipment 20(4) may be part of the traffic broadcast system 20, or alternatively, the broadcast system 20 may use broadcasting equipment from other types of systems, such as cellular or paging systems, FM radio stations, and so on, to broadcast the traffic messages 50 to the vehicles 11 in the region. (For purposes of this disclosure and the appended claims, the broadcasting of traffic messages is intended to include any form of transmission, including direct wireless transmission.)

Figure 3:
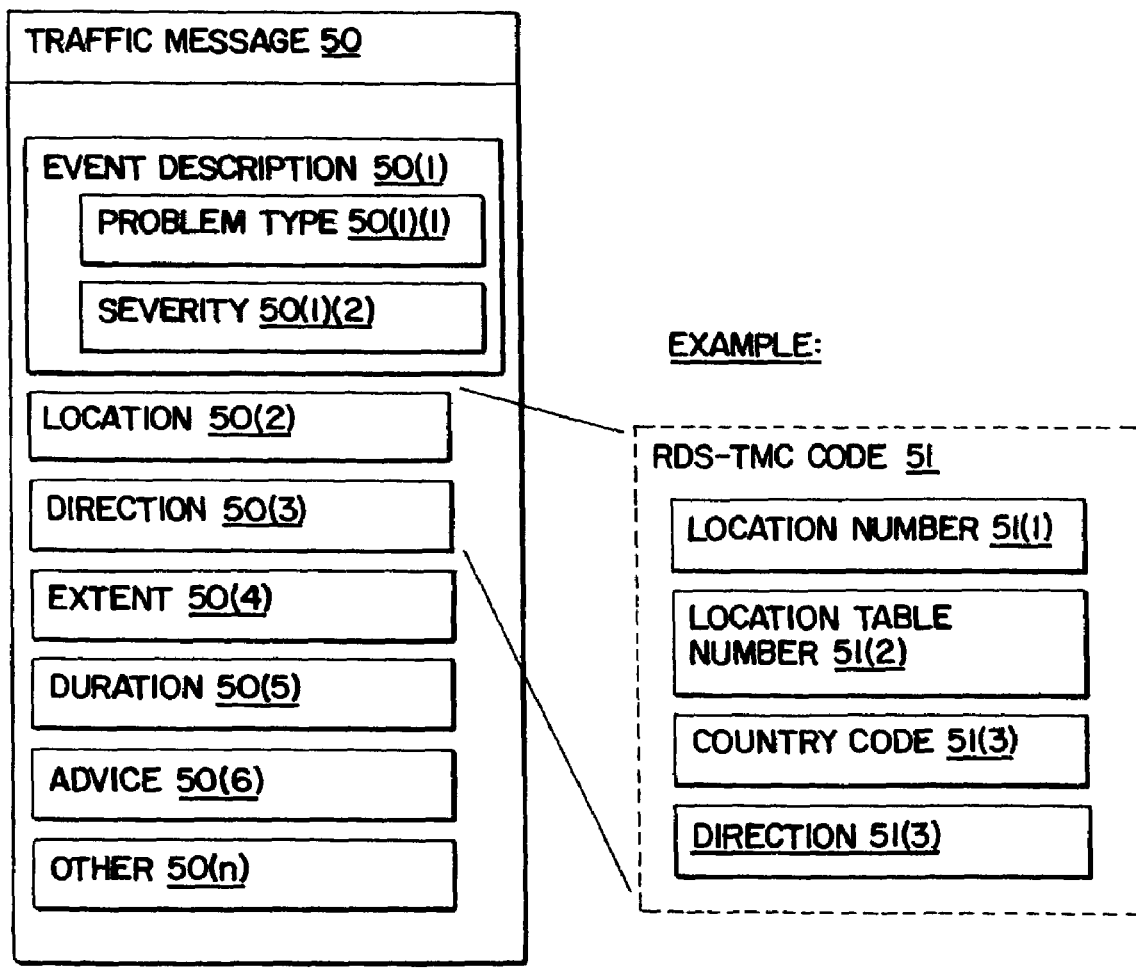
FIG. 3 is a diagram illustrating data components included in one of the traffic messages shown in FIG. 2.

FIG. 3 illustrates the data components of one of the traffic messages 50. The traffic message 50 can include various kinds of information. One useful kind of information that the traffic message 50 can include relates to traffic congestion. When used to provide information about traffic congestion, the traffic message 50 includes data components that identify one or more locations along a road that are congested, how bad the congestion is, and how far the congestion extends.

In the embodiment shown in FIG. 3, the traffic message 50 includes the following data components: an event description 50(1), a location 50(2), a direction 50(3), an extent 50(4), a duration 50(5) and advice 50(6). In alternative embodiments, the traffic message 50 may also include components that provide other information 50(n).

The event description component 50(1) includes data that describe a traffic problem 50(1)(1) along with data that describe a level of severity 50(1)(2) of the traffic problem 50(1)(1).

The location component 50(2) includes a reference number that identifies the location of the traffic problem 50(1)(1).

The direction component 50(3) includes data that indicate the direction of traffic affected.

The extent component 50(4) includes data that identify a length of a traffic congestion queue with respect to the location 50(2). The extent component 50(4) implicitly defines another (e.g., a secondary location) straddling the traffic condition in terms of the number of location references in between.

The advice component 50(6) provides a recommendation for a diversion of route.

According to one embodiment, the traffic message 50 conforms to the standard format for ALERT-C messages established in the RDS-TMC system. For example, in the RDS-TMC system, the location 50(2) portion of the message 50 is included in a RDS-TMC code 51. The RDS-TMC code 51 includes a location number 51(1), a location table number 51(2), a country code 51(3), and a direction 51(4). The location number 51(1) is a unique number within a region to which one location table (i.e., a database of numbers) corresponds. The location table number 51(2) is a unique number assigned to each separate location table. The country code 51(3) is a number that identifies the country in which the location referenced by the location number 51(1) is located. The direction 51(4) takes into account factors such as bi-directionality and whether or not the segments are external to the junction. The RDS-TMC code 51 is published in the message 50 in a string as follows:

| ABCCDEEEEE | |
|---|---|
| where: | |
| A | Direction of the road segment (=direction 51(4)) |
| B | Country code (=country code 51(3)) |
| CC | Location database number (=location table number 51(2)) |
| D | RDS direction (+,−, P, N) (=direction 51(4)) |
| EEEEE | Location code (=location number 51(1)) |

Vehicles 11 in the region 10 that have appropriate equipment installed in them can receive these traffic messages 50. These messages 50 can be provided to the drivers or passengers in these vehicles 11.

II. In-Vehicle Navigation System—Overview

Referring again to FIG. 2, the components of one of the vehicles 11 of FIG. 1 are shown. As mentioned above, the vehicle 11 may be a car or truck. Installed in the vehicle 11 is a navigation system 110. The navigation system 110 is a combination of hardware and software components. In one embodiment, the navigation system 110 includes a processor 112, a drive 114 connected to the processor 112, and a non-volatile memory storage device 116 for storing a navigation application software program 118 and possibly other information. The processor 112 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, may also be suitable.

The navigation system 110 may also include a positioning system 124. The positioning system 124 may utilize GPS-type technology, a dead reckoning-type system, or combinations of these, or other systems, all of which are known in the art. The positioning system 124 may include suitable sensing devices 123 that measure the traveling distance speed, direction, and so on, of the vehicle. The positioning system 124 may also include appropriate technology to obtain a GPS signal, in a manner which is known in the art. The positioning system 124 outputs a signal to the processor 112. The signal from the positioning system 124 may be used by the navigation application software 118 that is run on the processor 112 to determine the location, direction, speed, etc., of the vehicle 11.

The vehicle 11 includes a traffic message receiver 125. The receiver 125 may be an FM receiver tuned to the appropriate frequency at which the traffic broadcast system 20 is using to broadcast the traffic messages 50. The receiver 125 receives the traffic messages 50 from the traffic broadcast system 20. (In an alternative in which the traffic messages are sent by a direct wireless transmission, such via a cellular wireless transmission, the receiver 125 in the vehicle 11 may be similar or identical to a cellular telephone.) The receiver 125 provides an output to the processor 112 so that appropriate programming in the navigation system 110 can utilize the data broadcast by the traffic broadcast system 20 when performing navigation functions, as described more fully below.

The navigation system 110 also includes a user interface 131. The user interface 131 includes appropriate equipment that allows the end-user (e.g., the driver or passengers) to input information into the navigation system. This input information may include a request to use the navigation features of the navigation system. For example, the input information may include a request for a route to a desired destination. The input information may also include requests for other kinds of information. The user interface equipment used to input information into the navigation system 110 may include a keypad, a keyboard, a microphone, etc., as well as appropriate software, such as a voice recognition program. The user interface 131 also includes suitable equipment that provides information back to the end-user. This equipment may include a display 127, speakers 129, or other means.

The navigation system 110 uses a map database 140 stored on a storage medium 132. The storage medium 132 is installed in the drive 114 so that the map database 140 can be read and used by the navigation system. The storage medium 132 may be removable and replaceable so that a storage medium with an appropriate map database for the geographic region in which the vehicle is traveling can be used. In addition, the storage medium 132 may be replaceable so that the map database 140 on it can be updated easily. In one embodiment, the geographic data 140 may be a geographic database published by Navigation Technologies of Sunnyvale, Calif.

In one embodiment, the storage medium 132 is a CD-ROM disk. In an alternative embodiment, the storage medium 132 may be a PCMCIA card in which case the drive 114 would be substituted with a PCMCIA slot. Various other storage media may be used, including fixed or hard disks, DVD disks, or other currently available storage media, as well as storage media that may be developed in the future. The storage medium 132 and the geographic database 140 do not have to be physically provided at the location of the navigation system. In alternative embodiments, the storage medium 132, upon which some or all of the geographic data 140 are stored, may be located remotely from the rest of the navigation system and portions of the geographic data provided via a communications link, as needed.

In one exemplary type of system, the navigation application software program 118 is loaded from the non-volatile memory 116 into a RAM 120 associated with the processor 112 in order to operate the navigation system. The processor 112 also receives input from the user interface 131. The input may include a request for navigation information. The navigation system 110 uses the map database 140 stored on the storage medium 132, possibly in conjunction with the outputs from the positioning system 124 and the receiver 125, to provide various navigation features and functions. The navigation application software program 118 may include separate applications (or subprograms) that provide these various navigation features and functions. These functions and features may include route calculation 141 (wherein a route to a destination identified by the end-user is determined), route guidance 142 (wherein detailed directions are provided for reaching a desired destination), map display 143, and vehicle positioning 144 (e.g., map matching). Also included in the programming 118 on the navigation system is location referencing programming 145, which is explained in more detail below. Other functions and programming 146, in addition to these, may be included in the navigation system 110. The navigation application program 118 may be written in a suitable computer programming language such as C, although other programming languages, such as C++ or Java, are also suitable.

All of the components described above may be conventional (or other than conventional) and the manufacture and use of these components are known to those of skill in the art.

III. The Geographic Map Database

A. Overview

In one present embodiment, the speed and/or functionality of a navigation system can be enhanced by a combination that includes improvements in the storage, arrangement, and/or structuring of the geographic data used by the system to facilitate the use of the data by some of the functions in the navigation application program in the systems that use the data. Based upon the manner in which the geographic data are stored, arranged, and/or structured, functions in the navigation application program that access and use the data can implement routines that exploit the improvements incorporated into the geographic data. This combination can result in overall improved performance by the navigation system.

The map database 140 contains information about the roadway network in the geographic region. In one embodiment, the map database 140 includes node data and segment data. These data represent components of the physical road network. Node data represent physical locations in the geographic region (such as roadway intersections and other positions) and segment data represent portions of roadways between the physical locations represented by nodes. Each road segment in the geographic region is represented by a road segment data entity (i.e., a record) in the map database 140. Each road segment data record in the map database is associated with two nodes which represent the coordinate positions at each end of the road segment represented by the road segment data record. The information included in the node and segment data entities is explained with reference to FIGS. 4 and 5. (The terms "nodes" and "segments" represent only one terminology for describing these physical geographic features and other terminology for these features is intended to be encompassed within the scope of these concepts.)

Figure 4:
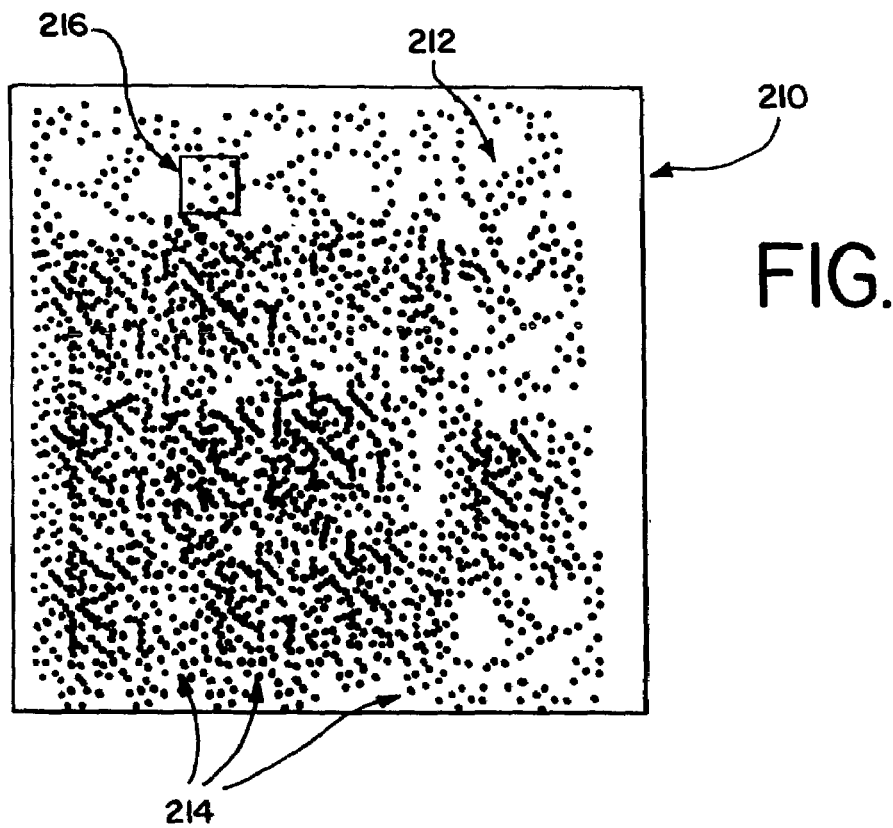
FIG. 4 illustrates a map illustrating a geographic region which may correspond to the region shown in FIG. 1.

FIG. 4 illustrates a map 210 showing a geographic region 212. The geographic region 212 in FIG. 4 may correspond to the geographic region 10 in FIGS. 1 and 2, or the geographic region 212 may have different boundaries. In a present embodiment, the region 10 (in FIG. 1) for which the traffic broadcast system 20 provides traffic condition service is encompassed within he region 212 (in FIG. 4) represented by the geographic database 140.

In FIG. 4, a plurality of locations 214 are shown to be located in the geographic region 212. Each of the locations 214 represents a place or point in the geographic area 212 at which there is located a feature about which it is desired to include information in a geographic database. Each of these locations 214 has a unique physical location (latitude, longitude, and optionally absolute or relative altitude) and each of the locations 214 can be uniquely identified by its two dimensional (or three dimensional) geographic coordinates (i.e., latitude, longitude, and optionally altitude). A location 214 may correspond to an intersection at which two or more roads meet, a point along a road segment at which the direction of the road changes, a point along a road segment at which the speed limit changes, a point at which a road reaches a dead end, and so on. The location 214 may correspond to a position of a point-of-interest, such as a hotel or civic center, a boundary of a natural feature, such as a lake, or a position along a railroad track or ferry. Each of the locations 214 may correspond to anything physically located in the geographic area 212.

Figure 5:
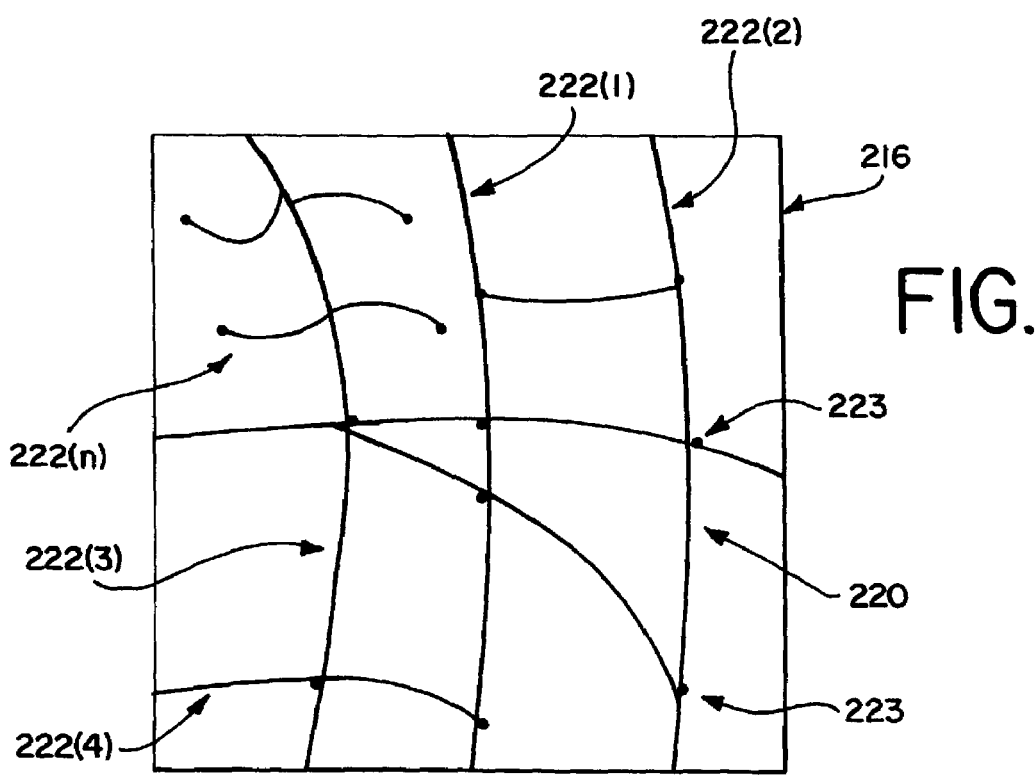
FIG. 5 is an expanded view of a portion of the map of FIG. 4.

FIG. 5 shows an expanded view of a portion 216 of the map 210. The portion 216 in FIG. 5 illustrates part of the road network 220 in the geographic region 212. This road network 220 may correspond to the road network 12 in FIGS. 1 and 2 or alternatively the road networks 220 and 12 may be different. In a present embodiment, the road network 12 about which the traffic broadcast system 20 provides traffic condition data is encompassed within the road network 220 represented by the geographic database 140. The road network 220 includes among other things, roads and intersections located in the geographic region 212. As shown in FIG. 5, in the illustrated portion 216 of the map 210, each road in the geographic region 212 is composed of one or more segments, 222(1), 222(2) . . . 222(n). In one embodiment, a road segment represents a portion of the road. In FIG. 5, each road segment 222 is shown to have associated with it two nodes 223: one node represents the point at one end of the road segment and the other node represents the point at the other end of the road segment. The node at either end of a road segment may correspond to a location at which the road meets another road, e.g., an intersection, or where the road dead ends.

In one type of geographic database, there is at least one database entry (also referred to as "entity" or "record") for each road segment represented in a geographic region. This road segment data record may have associated with it information (such as "attributes", "fields", etc.) that allows identification of the nodes associated with the road segment and/or the geographic positions (e.g., the latitude and longitude coordinates) of the two nodes. In addition, the road segment record may have associated with it information (e.g., more "attributes", "fields", etc.), that specify the speed of travel on the portion of the roadway represented by the road segment record, the direction of travel permitted on the road portion represented by the road segment record, what if any turn restrictions exist at each of the nodes which correspond to intersections at the ends of the road portion represented by the road segment record, the street address ranges of the roadway portion represented by the road segment record, the name of the road, and so on. Each segment data entity that represents an other-than-straight road segment may include one or more shape point data attributes that define the other-than-straight shape of the road segment. The various attributes associated with a road segment may be included in a single road segment record, or preferably are included in more than one type of road segment record which are cross-referenced to each other.

In a geographic database that represents the region 212, there may also be a database entry (entity or record) for each node in the geographic region. The node data record may have associated with it information (such as "attributes", "fields", etc.) that allows identification of the road segment(s) that connect to it and/or its geographic position (e.g., its latitude and longitude coordinates).

B. Separate Subsets of Geographic Data

Figure 6:
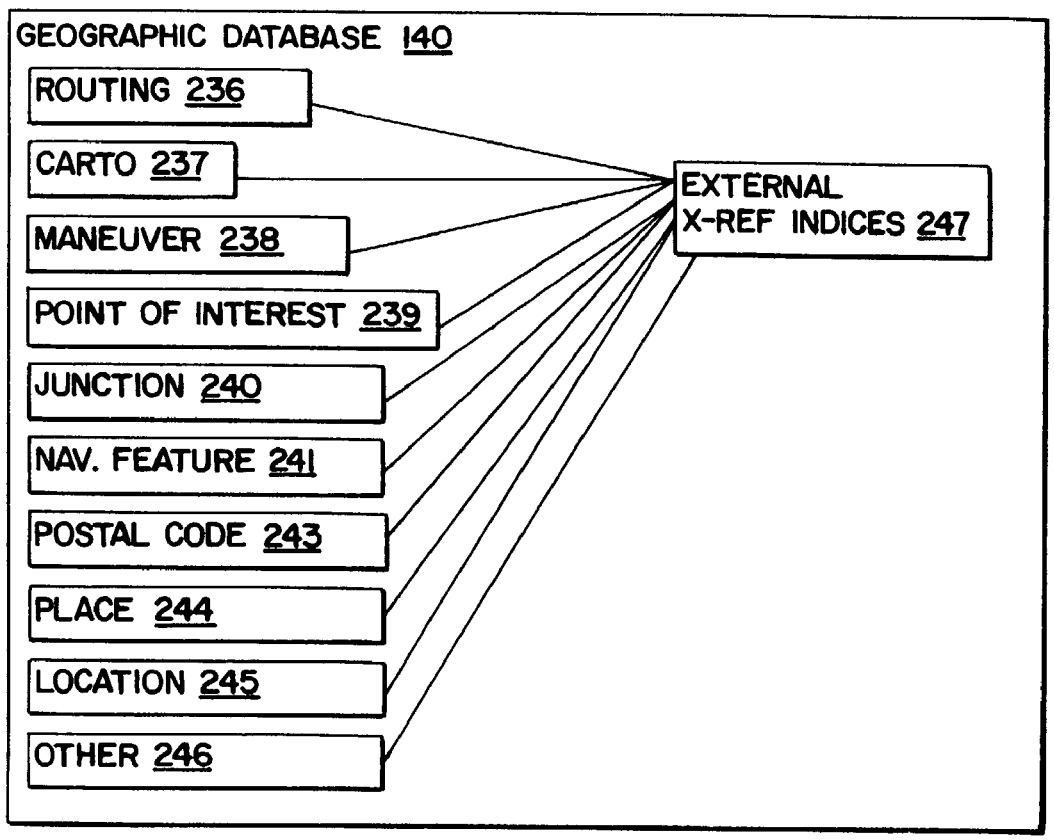
FIG. 6 is a block diagram showing an organization by type of the geographic database in FIG. 2.

Referring to FIG. 6, there is a diagram illustrating the organization of the geographic database 140 by data type. One way that the accessing of geographic data can be enhanced for performing various navigation functions is to provide separate collections or subsets of the geographic data 140 for use by each of the separate functions (e.g., 141–146) in the navigation application program 118. Each of these separate subsets is tailored specifically for use by one of the functions. For instance, the route calculation function 141 (in FIG. 2) normally requires only a portion of all the information in the geographic database that is associated with a segment of a road. When the route calculation function 141 is being run, it may require information such as the speed along a road segment, turn restrictions from one road segment to another, and so on. However, the route calculation function 141 does not necessarily require the name of the road to calculate a route. Similarly, when using the map display function 143, some of the information associated with a road segment, such as the speed limits or turn restrictions, is not required. Instead, when the map display function 143 is run, it uses only a portion of the information associated with the road segment, such as the shapes and locations of roads, and possibly the names of the roads. Even further, when the route guidance function 142 is being run, some of the information associated with a segment of a road, such as the speed and turn restrictions, is not required. Instead, when the route guidance function 142 is being run, it uses information that includes the name of the road represented by the road segment, the address range along the road segment, any signs along the road segment, and so on. Although there may be some overlap as to the types of information used by the various navigation functions, some of the data used by any one of these navigation functions is not used by another of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

In order to provide the information in the geographic database in a format more efficient for use by each of the navigation functions, separate subsets of the entire geographic database for a given geographic region are provided for each of the different types of navigation functions to be provided in the navigation application program 118.

FIG. 6 illustrates the geographic database 140 comprised of separate routing data 236, cartographic data 237 (for map display), maneuver data 238 (for route guidance), point-of-interest data 239 (for identifying specific points of interest, such as hotels, restaurants, museums, stadiums, airports, etc.), and junction data 240 (for identifying named intersections). In addition to these types of data, the geographic database 140 may include navigation feature data 241. This subset of data includes the names of the navigable features (such as roads). The geographic database may also include data subsets for postal codes 243 and places 244 (e.g., cities, states, and counties). In a present embodiment, the geographic database 140 includes a separate subset of data for location references 245, as explained further below. A geographic database may be defined with fewer or more subsets than these, and other types of data 246 may be defined and included.

Each subset of data includes only the data required to be used by a particular navigation function. There is some overlap of data between each of these subsets, with the result that some parts of the information may be included in more than one subset. For example, both the road segment data entity in the routing data subset 236 as well as the road segment data entity in the cartographic data subset 237 may include attributes identifying the nodes located at the ends of the segments. Although this duplication may result in a larger overall data storage requirement, each of the navigation functions benefits from the resultant efficiency of handling smaller amounts of data.

Providing for separate subsets of geographic data for each of the navigation functions also takes into account that usage of each of these navigation functions relates to the others of the navigating functions in expected ways. For example, an end-user may first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by each of the different navigation functions, it becomes necessary to provide that the different navigating functions that use these different subsets of the database work together. For example, in the example mentioned above, after an end-user obtains a calculated route, it may be desired to display a map on a computer display with the calculated route highlighted. In order to accomplish this, the routing subset 236 of geographic data is accessed first to obtain the routing road segment data entities for the optimum route, and then the cartographic subset 237 of the geographic database is accessed to obtain the cartographic road segment data entities corresponding to the routing data entities. To permit these data subsets to work together, indices may be included that provide cross references, search trees, or other data finding techniques. Indices can be located within any of the subsets of data or external of any of the subsets. In FIG. 6, external indices 247 are shown. Storing indices external of the data that are being indexed has the advantage that the index can be loaded and used to determine which data among the various subsets of data needs to be loaded next.

C. Layering of Geographic Data

Another way that the geographic data can be organized to enhance their use is to provide the data in layers. Some of the navigation functions (such as the map display function 143 and the route calculation function 141 in FIG. 2) may use data at different levels of detail. For example, when using the map display function 143, it is sometimes desired to provide for panning and zooming. Zooming can be done more efficiently if the data are organized into layers, with greater detail at the lower layers and less detail at the higher layers. When using the route calculation function 141, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data types, the geographic data are provided in separate collections or groups corresponding to separate layers.

To implement layering, each road segment data record in the map database 140 also identifies the rank of the corresponding portion of the roadway that it represents. A rank of a road segment may correspond to its functional class. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Roads having a rank of "0" can handle the lowest volumes. For example, these roads lowest ranked roads may include side streets, alleyways, etc.

The rank of a road segment data entity also specifies the highest data layer in which a road segment entity is included. For example, referring to FIG. 7, the routing type data 236 may include five separate layers of the data, R0, R1, R2, R3, and R4, each comprising a separate collection of the routing data with a different level of detail, which can be used by the route calculation function. In the routing data type of the geographic database, layer 0 ("R0") includes the road segment data entities (and some or all of their corresponding routing data attributes) having a rank of "0" or higher. Thus, layer 0 includes road segment data entities corresponding to all the portions of all the roads in the geographic region. Layer 1 of the routing data 236 comprises a separate subset (or collection) of the routing data and includes only the routing segment data entities (and some or all of their corresponding routing data attributes) having a rank of "1" or higher. Layer 2 of the routing data comprises a separate subset of the routing data and includes only the routing segment data entities (and some or all of their corresponding navigation data attributes) having a rank of level 2 or higher, and so on. A highest layer (layer n) includes only records having a rank of n. In a present embodiment, n is equal to 4, although in other embodiments, n may be any number greater than 0. Each higher layer includes fewer records, however these records represent roads upon which travel is generally faster.

Similarly, the other types of data, such as the cartographic subset type 237 may include separate collections of the data, each with a different level of detail, which can be used by the map display function. Using these different layers of cartographic data, the map display function can provide rapid panning and zooming.

Figure 7:
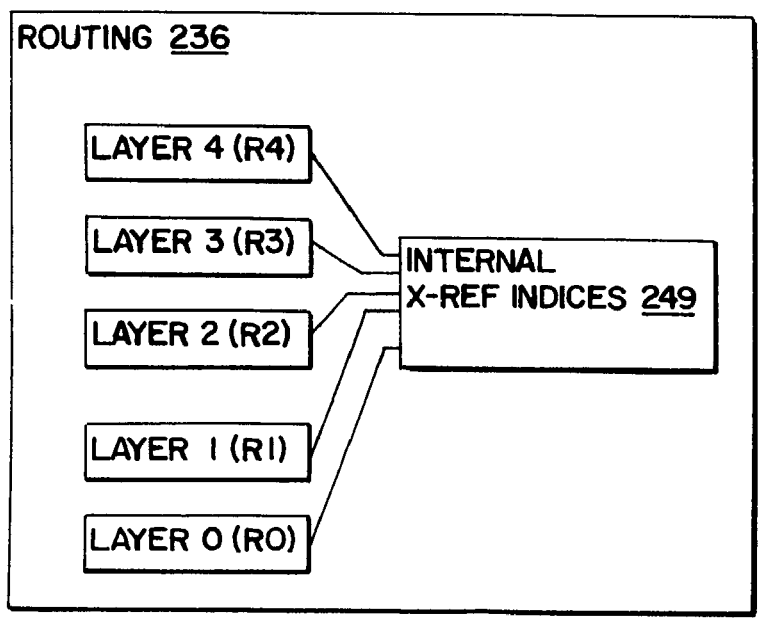
FIG. 7 is a block diagram showing an organization by layer of the routing type of the geographic database shown in FIG. 6.

Although the organization of some of the data into layers results in some duplication of the data, the increased efficiency provided by layering generally offsets any disadvantages. As with the use of separate types of data mentioned above, the need arises to allow these layers to work together. Indices 249 may be provided for this purpose. In FIG. 7, internal indices are shown. Internal indices 249 are included among the various types of data.

D. Parcelization of Geographic Data

Figure 8:
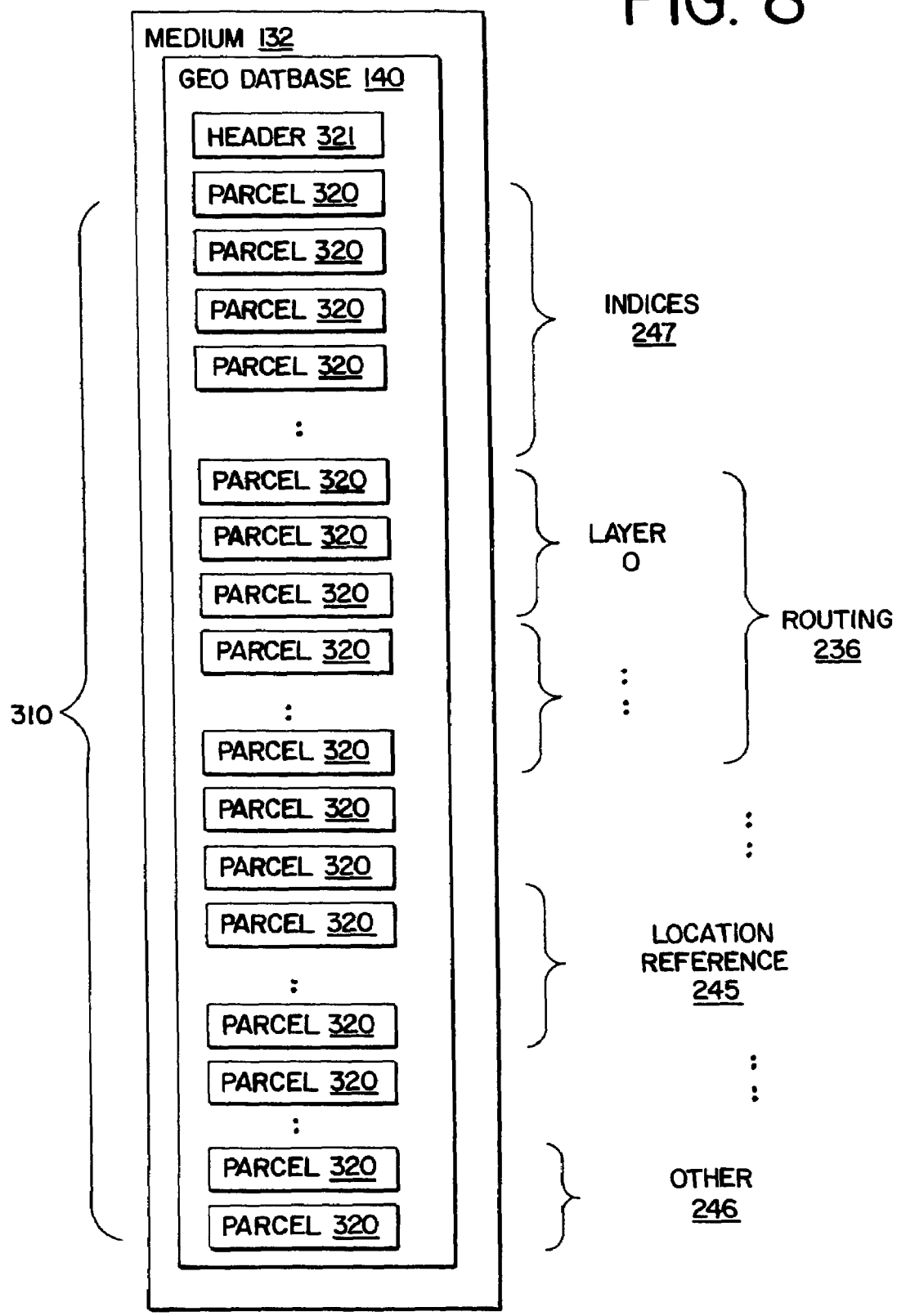
FIG. 8 is a block diagram showing an organization of the geographic database shown in FIG. 2.

FIG. 8 is a diagram illustrating the organization of the geographic database 140 embodied on the data storage medium 132. The geographic database 140 on the medium 132 includes header and global data 321 and geographic data 310. The header and global data 321 include information pertaining to the entire geographic database 140, such as an identification of the region (e.g., 212 in FIG. 4) represented by the database, the release date of the database, what kinds of data compression are used, if any, and so on. The geographic data 310 includes the data relating to the geographic features. Specifically, the geographic data 310 includes all the data which correspond to the different types of geographic data represented in FIG. 6, such as the routing data 236, the cartographic data 237, the maneuver data 238 and so on. The geographic data 310 also include indices, such as the indices 247 shown in FIG. 6 and the indices 249 shown in FIG. 7.

Within the geographic database 140, the geographic data 310 are organized by type (shown in FIG. 6) and by layer (as shown in FIG. 7) for those types that have layers. Within each type and layer, the data 310 are comprised of a plurality of data entities or records. Within each type and layer, these data entities are grouped into a plurality of parcels 320. Each parcel contains a portion of the plurality of data entities which comprise each type or layer of the geographic data 310. In one embodiment, the size of each parcel conforms to a regular data size, e.g., sixteen kilobytes, eight kilobytes, etc. This organization of data records into parcels facilitates storage and retrieval of the geographic data. In one embodiment, all the data which correspond to the different types of geographic data represented in FIG. 6, such as the routing data 236, the cartographic data 237, the maneuver data 238, and so on, are organized into parcels 320.

Methods for parcelizing data are disclosed in copending applications Ser. Nos. 08/740,295 and 08/924,328, the disclosures of which are incorporated by reference herein.

IV. COORDINATION OF TRAFFIC MESSAGES WITH GEOGRAPHIC MAP DATABASE

A. Overview

In a present embodiment, a means is provided that facilitates using traffic messages that are broadcast by a traffic broadcast system in conjunction with a navigation system that also uses a geographic database. For example, with reference to the traffic message system 20 shown in FIGS. 1 and 2, the present embodiment provides a means that facilitates using the traffic messages 50 broadcast by the broadcast system 20 in conjunction with the navigation system 110 that uses the geographic database 132 shown in FIGS. 1, 2 and 6–8. Using broadcast traffic messages together with a geographic database allows a navigation system to provide improved navigating features to a driver. In addition, using broadcast traffic messages together with a geographic database also allows a navigation system to provide navigation features that had previously been unavailable. One important advantage of using traffic broadcast messages together with a geographic database is that a route calculation function in the navigation system can take into account up-to-the-minute traffic conditions when calculating a route to a desired destination location.

In order to use traffic messages together with a geographic database, the present embodiment provides a means by which the navigation system relates the data in the traffic messages to the data in the geographic database. One consideration in this process is that the data in the traffic message may have a different form than the data in the geographic database. Another consideration is that the traffic broadcast system may assign specific reference codes to locations in the geographic region about which the traffic messages relate. Traffic broadcast systems, such as the RDS-TMC system, use these reference codes instead of the actual location names for several reasons. For example, using reference codes avoids possible ambiguities that might arise if actual street names or addresses were used. Also, specially assigned codes may be necessary where particular locations along roads do not have names. In addition, using codes instead of actual location names may reduce the overall size of the data messages that are broadcast.

Although using reference codes for identifying particular locations may be helpful for traffic broadcast systems that provide information about traffic congestion, and in particular about congestion along major highways, such location reference codes may not be readily usable by navigation systems that include geographic databases. One reason that navigation systems may not be able to readily use the location reference codes assigned by the traffic broadcast system is that these codes do not necessarily correspond to any known physical features. For example, the location reference codes for positions along an interstate highway may be arbitrary n-bit (e.g., 20 bit) numbers. These numbers by themselves do not necessarily have any meaning for end-users of navigation systems, such as motorists. Motorists are not likely to know the n-bit location reference code number for a particular highway interchange. Likewise, a traffic message that identified a location of traffic congestion by referring to its n-bit location reference number would not necessarily have any meaningful significance to end-user drivers.

As noted above, one example of a traffic broadcast system is the RDS/TMC system. The RDS-TMC messages conform to the ALERT-C protocol. In the RDS/TMC system, many primary and some secondary road interchanges have pre-defined location numbers. These location numbers are a part of the traffic messages that are broadcast: These location numbers are assigned by the road authorities or other parties involved in the development and maintenance of the RDS/TMC system. These location numbers are standardized for all users. That is, any receiver that uses the messages from the traffic broadcast system is required to be able to relate the location reference numbers in the RDS-TMC messages to the known locations to which the numbers are assigned.

In places where these types of location numbers are assigned, the location reference numbers may be unique within a regional database of the specific traffic broadcast system. Such a regional database is known as a "location table." A separate location table is defined for each different region. This location table region corresponds to the region 10 in FIG. 1, but does not necessarily correspond to (i.e., have boundaries that coincide exactly with) the geographic area 212 in FIG. 4.

Figure 9:
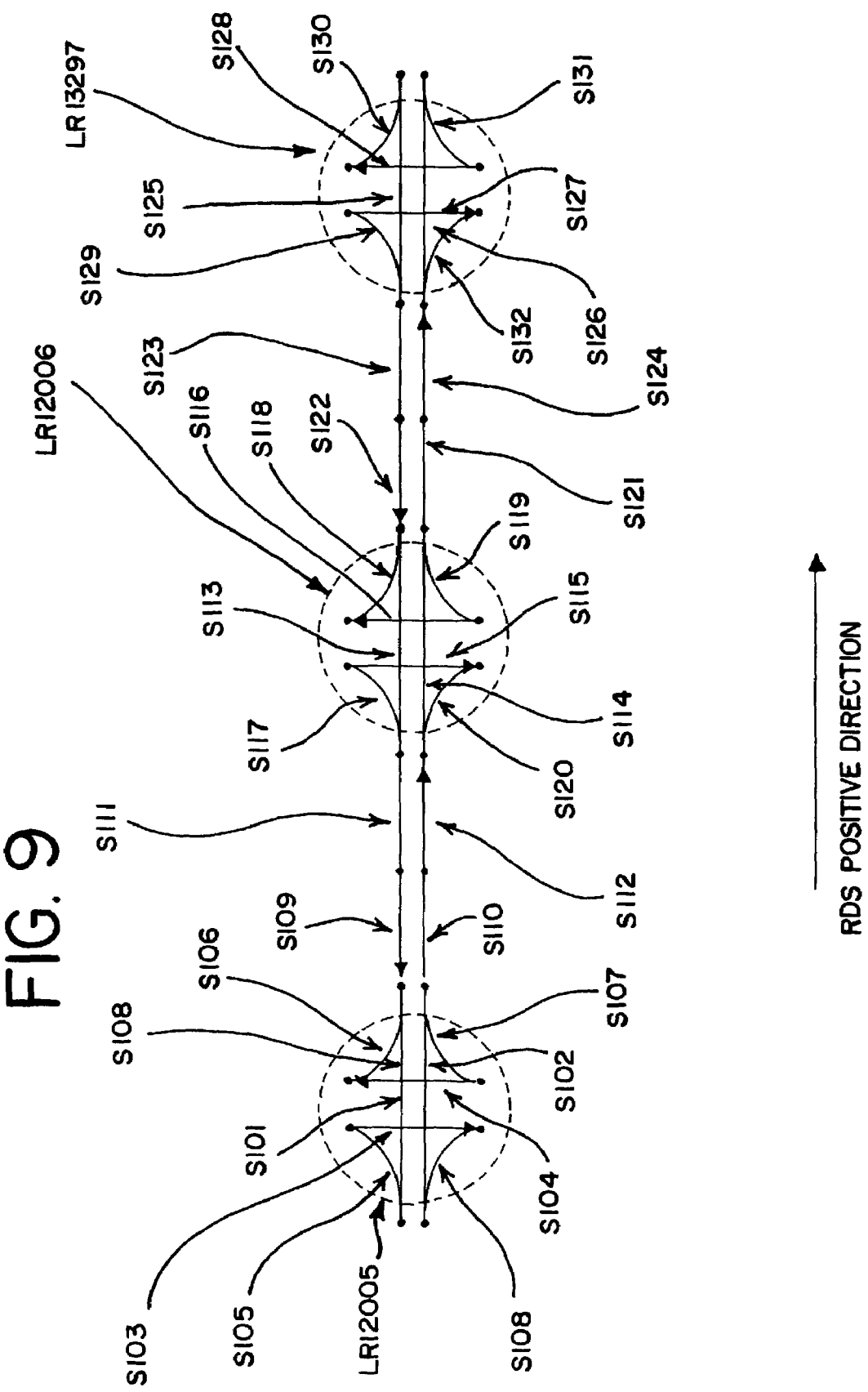
FIG. 9 is an illustration of a portion of a roadway along which intersections have been assigned location reference numbers which are used by the traffic broadcast system of FIG. 1.

FIG. 9 shows one example of how location reference numbers are assigned. The example of FIG. 9 is similar to the RDS/TMC system. FIG. 9 illustrates a portion of a roadway 500. This roadway 500 is one of the roadways in the roadway network 12 (in FIG. 1) about which the traffic broadcast system 20 monitors traffic congestion and about which the traffic broadcast system 20 reports on traffic congestion by means of traffic messages 50.

In order to identify locations along the roadway 500 at which traffic congestion occurs, location reference numbers (e.g., LR12005, LR12006, and LR13297) are pre-assigned to locations along the roadway 500. These location reference numbers are assigned by the road authorities or others involved with the traffic broadcast system 20. The messages 50 (in FIGS. 1–3) broadcast by the traffic broadcast system 20 include these location reference numbers when identifying locations of traffic congestion.

In traffic broadcast systems, such as the RDS-TMC system, the roadway 500 being monitored and about which traffic messages are broadcast is usually an expressway or major arterial road. Traffic conditions along minor roads may not be monitored by these kinds of traffic broadcast systems. Accordingly, in traffic broadcast systems, such as the RDS-TMC system, location reference numbers are assigned to locations along expressways and major arterial roads, but not along minor roads.

FIG. 9 shows only three location numbers, LR12005, LR12006, and LR13297. It is understood that in a typical traffic broadcast system, there may be hundreds, thousands, or more, of location reference numbers assigned to locations along roads in each region represented by a location table. As shown in FIG. 9, the location reference numbers correspond to interchanges along the roadway 500. However, location reference numbers may be assigned to any position along the roadway 500, including positions between interchanges.

In traffic broadcast systems, such the RDS-TMC system, directions may be defined as positive or negative. For example, in the RDS-TMC system, the direction is positive for travel directions west to east and from south to north. The location reference numbers may be, but are not necessarily, assigned in consecutive order along a roadway.

In traffic broadcast systems, such a the RDS-TMC system, each roadway is assigned its own location reference numbers. The location reference numbers of one roadway are not shared with other roadways. Therefore, at an interchange between two roadways each of which is assigned location reference numbers, one location reference number is assigned to the interchange for the first of the roadways and a second different location reference number is assigned to the same interchange for the second of the roadways. Thus, a single interchange may have two or more location reference numbers assigned to it, one for each of the roadways that meet at the interchange.

As mentioned above, one of the difficulties associated with using the location reference numbers with a navigation system that uses a geographic database is that the location reference numbers do not necessarily relate to any physical roadway features. As illustrated in FIG. 9, the roadway 500 is shown to consist of individual road segments, labeled S101, S102, ... S132. These road segments S101, S102, ... S132, correspond to individual portions (i.e., segments) of the roadway 500. For example, each of these individual segments of the roadway 500 may comprise a portion of the roadway 500 between intersections of the roadway 500 with other roads, including on-ramps and off-ramps. In the geographic database 140 (in FIG. 2), each of these separate road segments, S101, S102, ... S132, is represented by at least one separate data record.

In the roadway 500 shown in FIG. 9, there are separate road segments associated with the lanes of the roadway 500 for each direction. This represents a typical expressway configuration in which the lanes going in one direction are physically separate from the lanes going in the other direction. Where the lanes are actually physically separate from each other, such as in the portion of the roadway 500 depicted in FIG. 9, there may be separate segment data records in the geographic database 140 for the lanes in one direction and the lanes in the other direction. Even where the lanes of the roadway are not physically separated from each other, they may be represented by separate data records in the geographic database. Alternatively, a single segment data record may be included in the database that represents all the lanes of the roadway in both directions. The database records include attributes that indicate whether they represent lanes in both directions or only lanes in a single direction.

As illustrated in FIG. 9, there may be multiple segments, S101, S102, ... S132, of the roadway 500 associated with each location along the roadway 500 to which a location reference number (e.g., LR12005, LR12006 ...) has been assigned. As stated above, each of these multiple segments of the roadway 500 may be represented by at least one record in the geographic database 140. Moreover, as illustrated by FIG. 9, there may also be several segments of the roadway 500 located between the interchanges along the roadway 500 to which location reference numbers have been assigned. Each of these segments of the roadway 500 between interchanges may be represented by at least one record in the geographic database 140. However, none of these individual road segments S101, S102, ..., S132, is separately identified as relating to the location reference numbers by the traffic broadcast system in the messages that are broadcast.

As mentioned above, it would be advantageous if the data in the traffic messages 50 could be utilized when calculating a route using the route calculation function 141 in the navigation system 110 (in FIG. 2). If the data in the traffic messages could be used by the navigation system, the segments associated with traffic congested locations that are assigned location reference numbers could be avoided by the route calculation function. Unfortunately, as exemplified by FIG. 9, the location numbers assigned by the traffic broadcast system authorities do not directly relate to any physical feature represented by the data records in the geographic database 140. Moreover, the traffic messages broadcast by the traffic broadcast system 20 do not necessarily relate to any of the actual road segments that are represented by data records in the geographic database.

Still another factor that complicates using the traffic messages broadcast by a traffic broadcast system in a route calculation function in a navigation system is that, in systems such as the RDS-TMC system, the length of the roadway affected by an occurrence of traffic congestion is reported in terms of the "extent" data 50(4) which is included in the broadcast traffic message, as mentioned above in connection with FIG. 3. The "extent" data are defined in terms of the number of adjacent positions represented by location numbers that are affected by the traffic congestion condition relative to the position along the roadway identified by the location reference number in the traffic message. Thus, the "extent" data 50(4) also do not bear any direct relationship with physical features represented by data records in the geographic database. Using "extent" data in traffic messages compounds the difficulty of incorporating traffic broadcast message information in the route calculation function 141 of the navigation system 110.

In order to use the traffic message data to support a route calculation function, a way is required that relates the location reference data from a traffic message to the geographic data (such as the segment data records) in the geographic database used by the route calculation function. In a route calculation function, such as the function 141 shown in FIG. 2, route calculation may be performed by exploring multiple potential solution routes from a starting location to a destination location. The route calculation function 141 may perform this process by comparing multiple possible paths from intersections along parts of potential solution routes and selecting the path that has the best overall cost, based upon some cost assignment criteria. To compare these potential solution routes, or parts thereof, the data records that represent each road segment in these potential solution routes are examined. These data records include information from which a comparison of the potential solution routes can be made. For example, the data records that represent road segments may include attributes that indicate the speed limit along the represented road segment, whether there is a stop light at the end of the road segment, and so on. Using these data, the potential solution routes can compared to each other so that the best solution route (e.g., the route with the fastest overall travel time or the least overall distance) can be selected.

It can be appreciated that the data in the traffic messages 50 broadcast by the traffic broadcast system, such as the data that identify areas of traffic congestion, may be pertinent to the calculation of the best overall route. In order to incorporate the information in the traffic data messages into the route calculation function, it is required to identify the data records that represent the road segments that are associated with the interchanges, including those road segments that lead into the interchanges, for which location reference numbers have been assigned by the traffic broadcast system 20.

Figure 11:
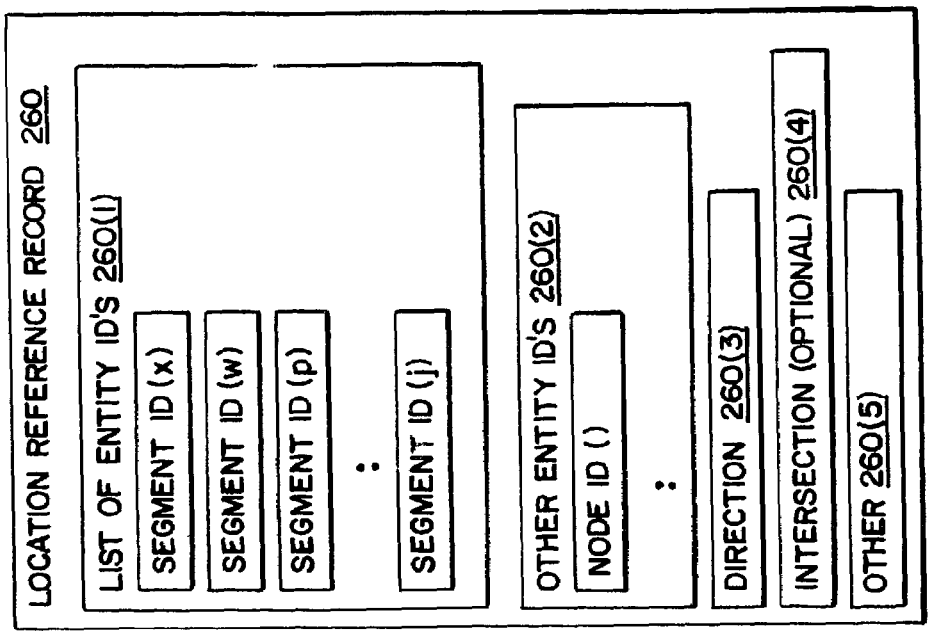
FIG. 11 is a block diagram illustrating the components that form the location reference record.
Figure 12:
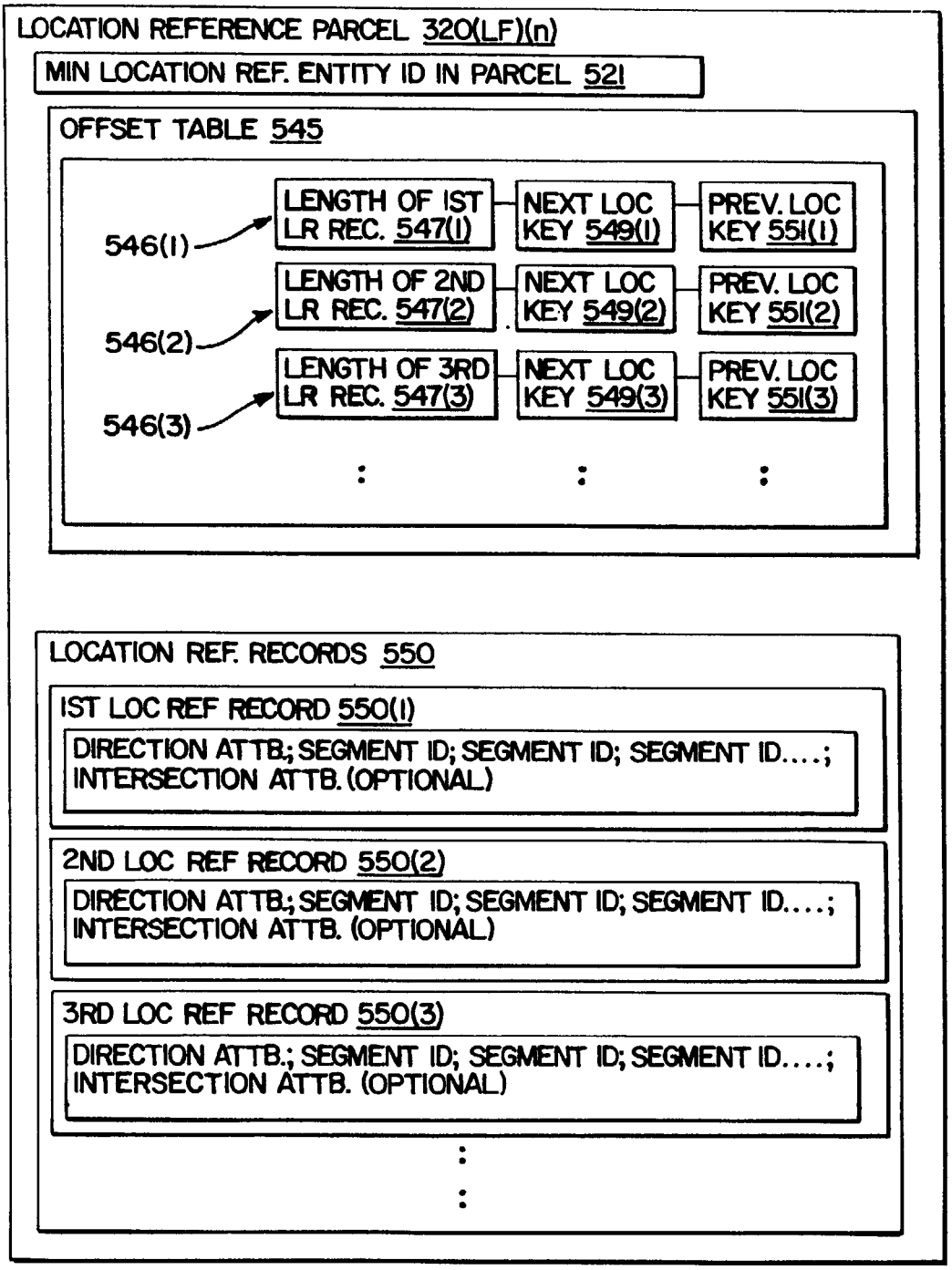
FIG. 12 is a block diagram illustration the organization of data in one of the parcels containing location reference data records shown in FIG. 8.
Figure 13:
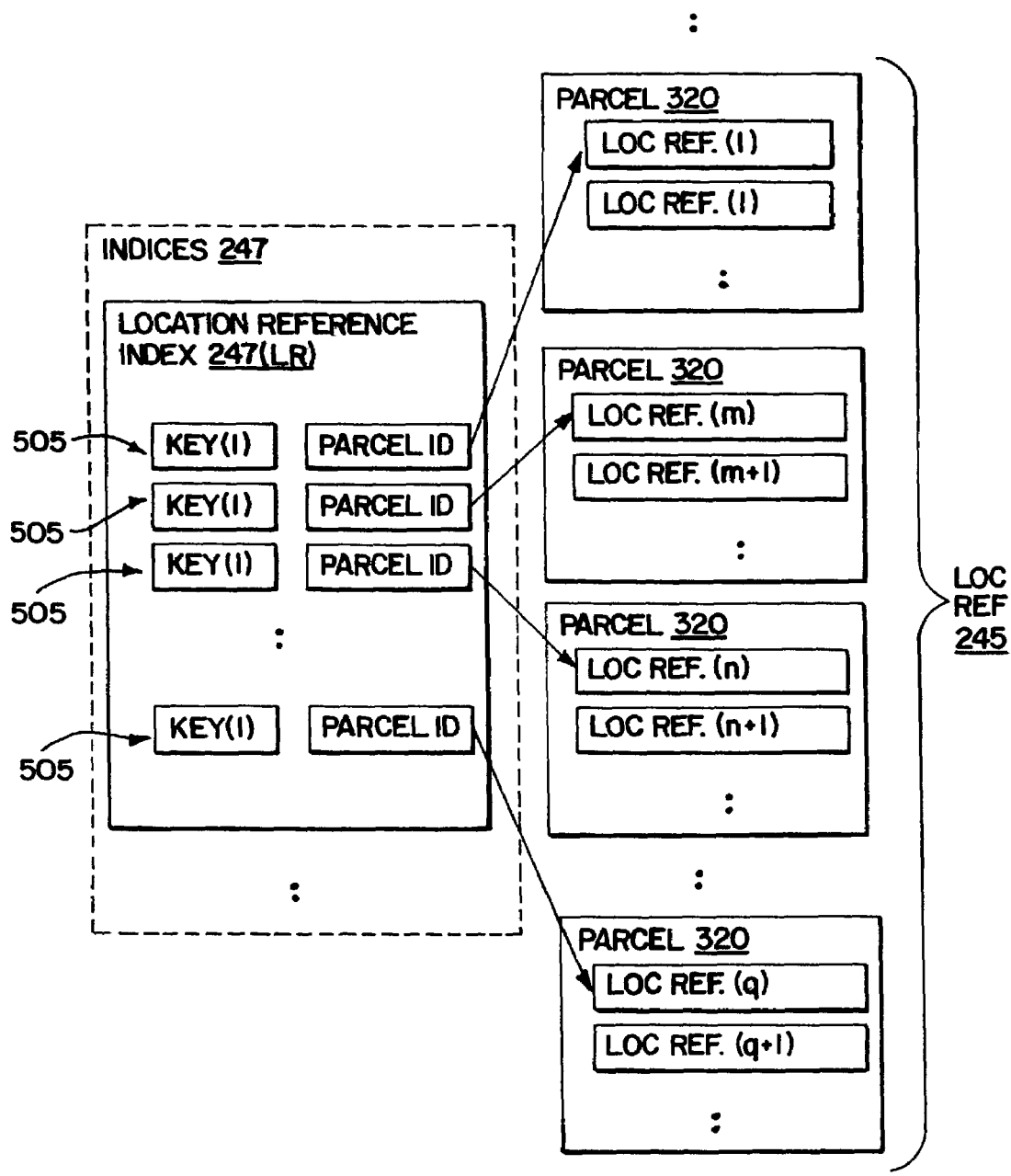
FIG. 13 is a block diagram illustrating the organization of indices for the location reference records.
Figure 14:
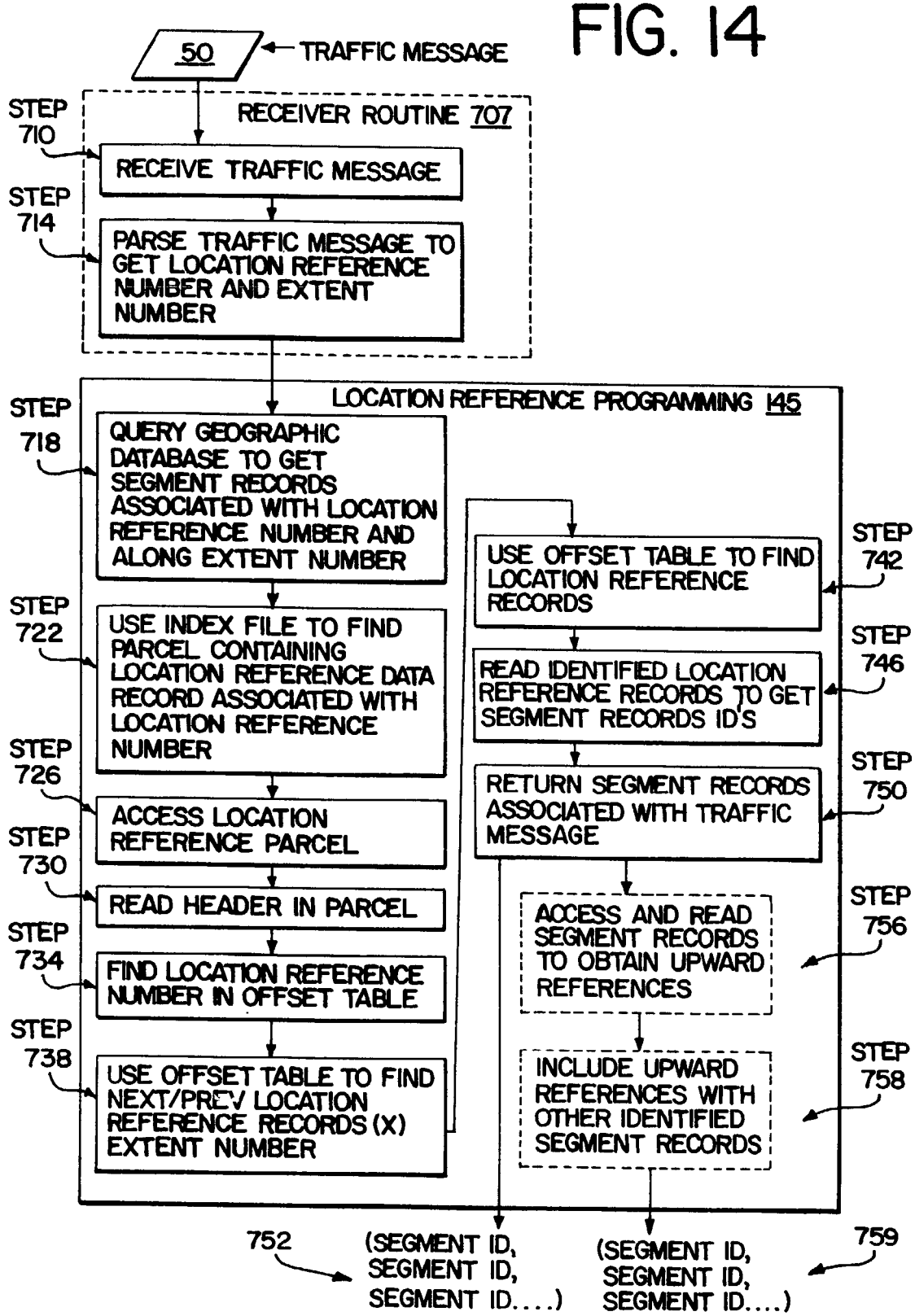
FIG. 14 is a flow chart illustrating the steps performed by programming in a navigation system of FIG. 2 that uses traffic broadcast message data in conjunction with geographic data.
Figure 15:
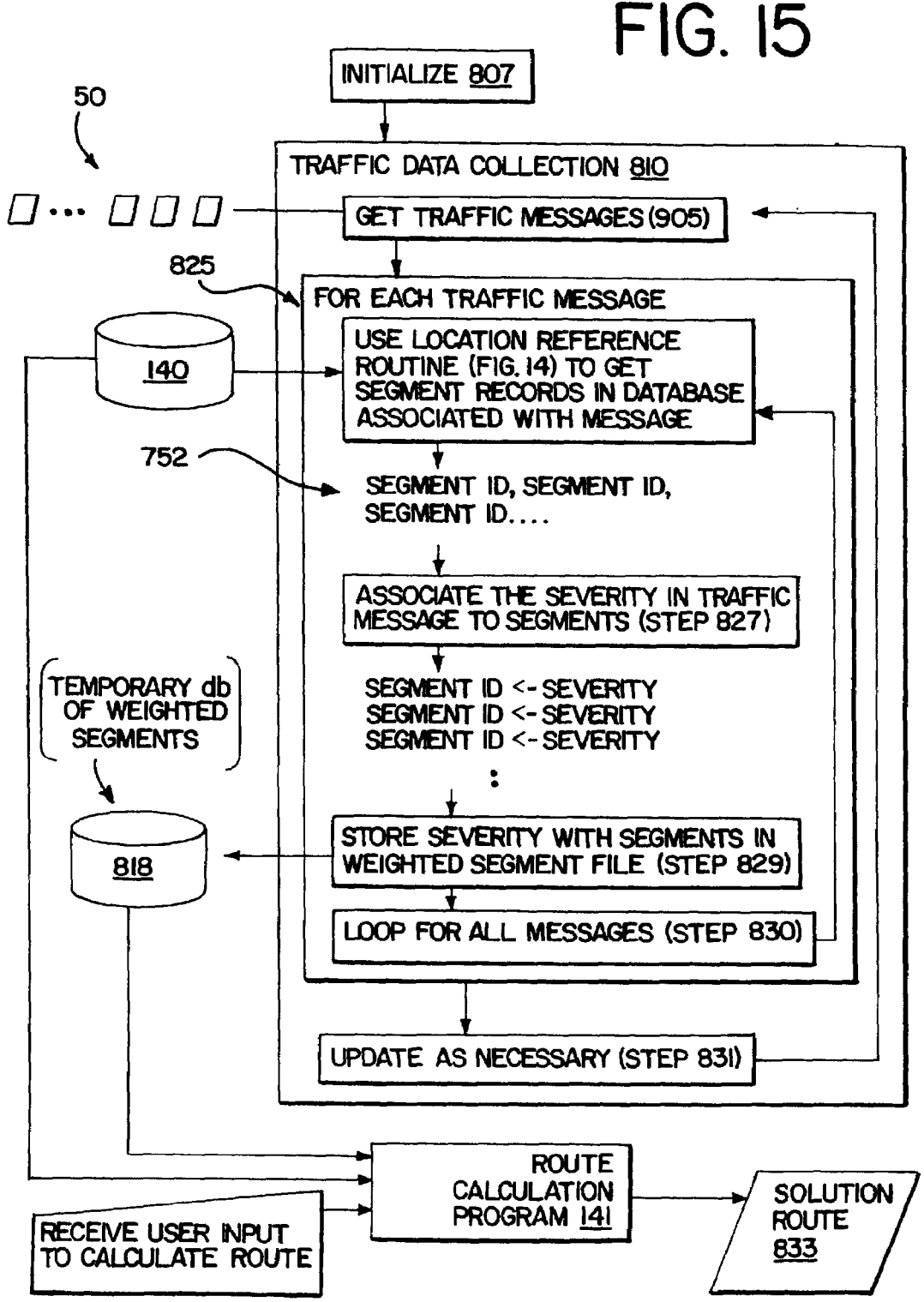
FIG. 15 is a flow chart showing the steps performed in a first example that uses the programming steps shown in FIG. 14.
Figure 16:
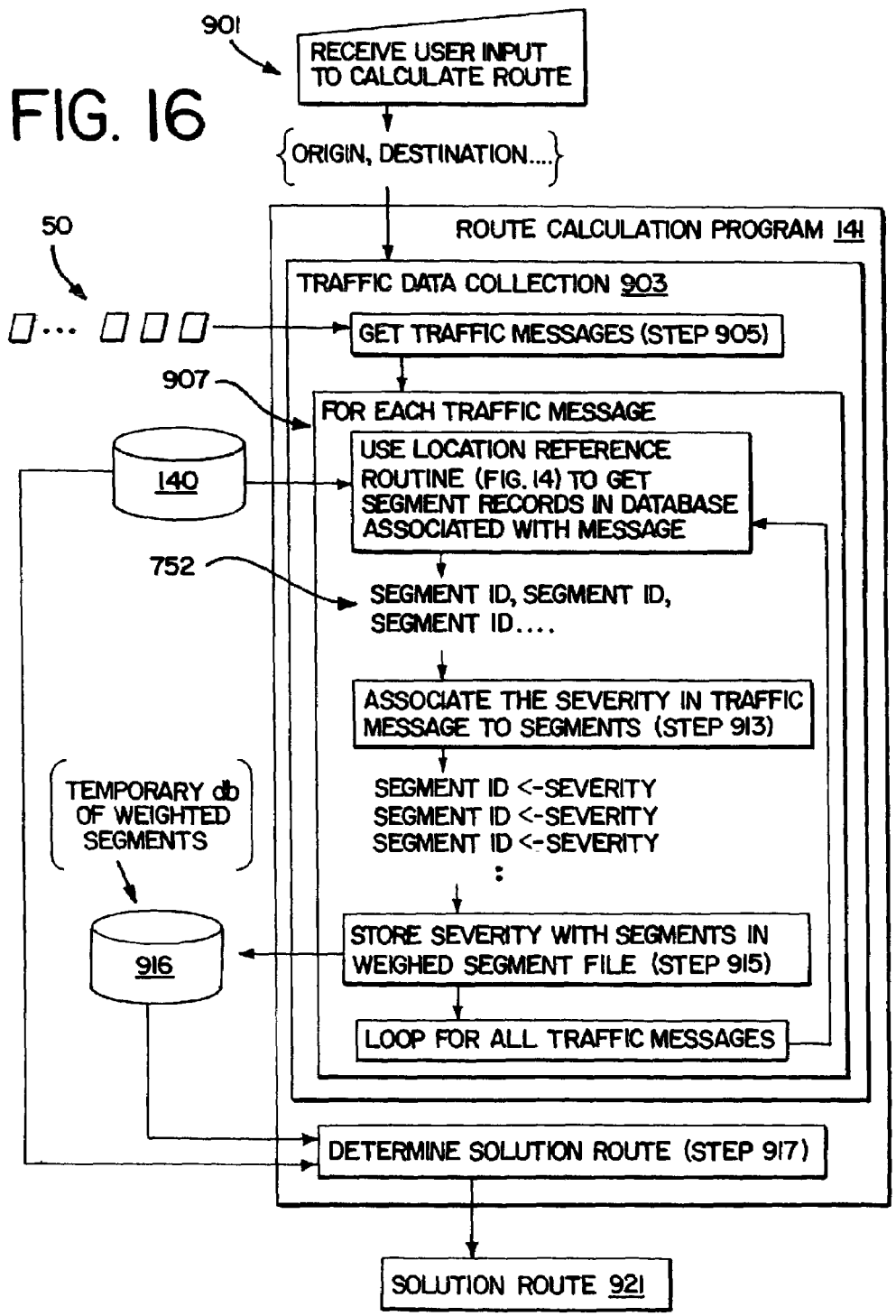
FIG. 16 is a flow chart showing the steps performed in a second example that uses the programming steps shown in FIG. 14.

To provide this function, present embodiments include combinations of features and/or components that allow a navigation application program 118 in the navigation system 110 to use the data in the-traffic messages 50. According to one aspect of a present embodiment, location reference data records are formed, stored and used to identify certain segment data records in the geographic database as being associated with certain location reference numbers. These location reference records may be included in the geographic database 141 or may be provided to vehicles via a wireless communication link. The components of a location reference record are illustrated in FIG. 11. According to another aspect of a present embodiment, one or more indices are formed, stored and used to relate location reference numbers to location reference records. These indices are illustrated in FIG. 13. According to another aspect of a present embodiment, parcels of location reference data record are formed, stored, and used. A parcel containing location reference data is illustrated in FIG. 12. According to another aspect of a present embodiment, data are formed, stored and used to identify, for each location reference number, the immediately previous and the immediately next location reference number. This allows the "extent" data in a broadcast message to be interpreted and related to records in the geographic database. According to still another aspect of a present embodiment, programming is included in the navigation system that queries the geographic database and returns the data entities associated with certain identified location reference numbers. This aspect of the present embodiment is illustrated in FIGS. 14–16.

Each of these aspects is described below.

B. Location Keys

As part of a present embodiment, data records are formed that provide for the association of certain data entities in the geographic database used by the navigation system with the location reference codes used by the traffic broadcast system. In a present embodiment, a "location key" is formed as part of this process. The location key is an aggregation of data components that relate to a location reference code. Each location key forms a unique identifier for that location code in the geographic database. Because of this feature, the location keys can be used as entity ID's for these records in the geographic database.

Figure 10:
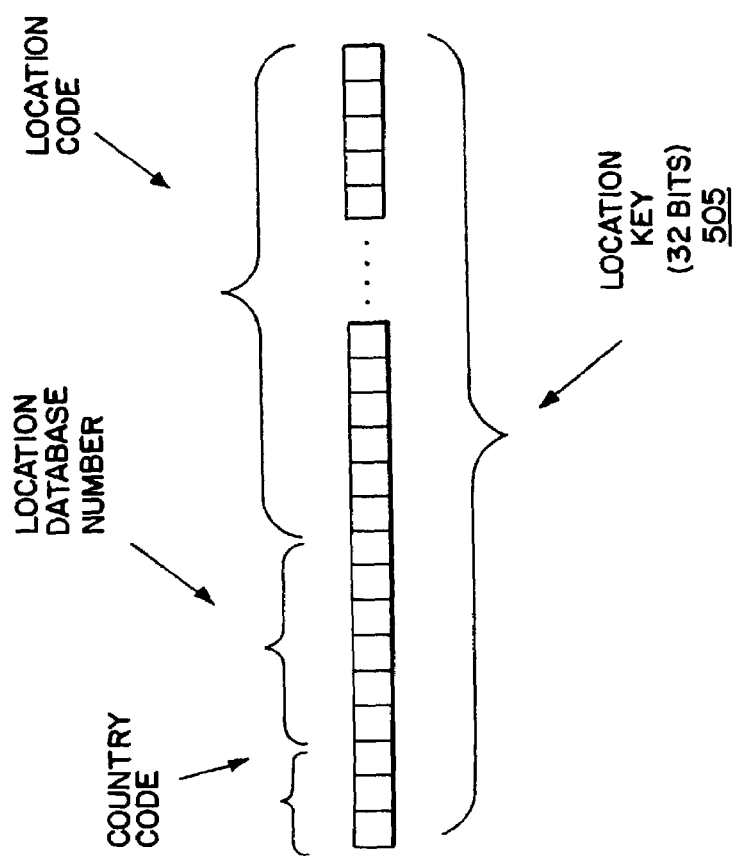
FIG. 10 is a diagram of the components of a location reference key formed to relate location reference numbers as shown in FIG. 9 to data included in the geographic database shown in FIGS. 2 and 8.

The components of a location key 505 are shown in FIG. 10. The location key 505 is formed of a combination of the country code, the location table number and the location number. This combination together forms a unique 32 bit number. The location number is 16 bits, the location table number is 6 bits, and the country code is 4 bits. This unique number is used as a numeric sort key, as explained below.

C. Data Components of Location Records

After the location keys are formed to provide a unique identifier for each location in the region represented by the geographic database for which one or more traffic broadcast systems have assigned location reference numbers, the data entities in the geographic database to be associated with each location key are identified. In a present embodiment, the data entities that represent road segments that are contained in or that lead into the interchanges represented by location keys are identified. For example, referring to FIG. 9, the interchange associated with the location reference number LR12006 contains both internal segments and external segments. The internal segments of the interchange represented by the location reference number LR12006 include S113 and S114. The external segments of the interchange represented by the location reference number LR12006 include the two segments, S110 and S112, that lead into the interchange in the positive direction and the two segments, S122 and S123, that lead into the interchange in the negative direction. The segment data entities associated with these 6 segments (S113, S114, S110, S112, S122 and S123) are identified as being associated with the location key for the interchange LR12006.

The segments leading out of the interchange LR12006, such as S121 and S111, are not associated with the location reference number for the interchange. Instead, these segments are associated with the location reference number of the interchange that they lead into. In the illustration of FIG. 9, the segment identified by S121 leads into the interchange represented by the location reference number LR13297, and the segment identified by S111 leads into the interchange represented by the location reference number LR12005. Accordingly, they are associated in the geographic database with the location keys for those interchanges.

FIG. 11 illustrates a location reference data record 260. The entity ID for this record is the location key, formed in the manner described above. The location reference record 260 includes a list 260(1) of segment ID's, (e.g., segment ID(x), segment ID(w), segment ID(p) . . . segment ID(j)). These segment ID's identify the segment data records that represent the road segments associated with the interchange identified by the location reference key. In the case of the location reference record that represents the interchange LR12006 in FIG. 9, there would be 6 segment ID's in the list 260(1) of entity ID's, i.e., S113, S114, S110, S112, S122, and S123.

In the list 260(1), the segment ID's are ordered. Various orderings may be used. In a present embodiment, the segment ID's are ordered to provide a valid navigable path. For example, S123, S122, S113, would form a valid path in the negative ("N") direction and S110, S112, and S114 form a valid path in the positive ("P") direction.

As mentioned above in connection with FIG. 7, the geographic database 140 may include more than one layer of certain types of data, such as the routing data 236. Each of these layers may assign a different segment ID to the same road segment. This has the result that the same road segment may be represented by more than one segment ID in the geographic database. The list 260(1) of segment entity ID's in the location reference data record 260 may include the segment record ID's for the lowest layer (i.e., layer R0), or for any other layer (e.g., layers R1–R4). Alternatively, the list 260(1) may include the segment entity ID's for more than one layer or for all the layers. If the list 260(1) of segment entity ID's includes the segment record ID's for the lowest layer only, a means may be provided to obtain the corresponding segment ID's of the road segments in other layers. For example, the segment data records in layer 0 may include references to the corresponding segment data records in other layers that represent the same road segment.

Because the roadways to which location reference numbers have been assigned by the traffic broadcast system tend generally to be high volume, limited access roads, the roadway tends to be made up of segments of only the highest rank, e.g., rank 4.

When a geographic database 140 includes layers, higher layers may include data records that represent aggregations of individual road segments. Aggregations of road segments in higher layers may be represented by separate data records because the intersections of the higher ranked road segments with lower ranked road segments may be suppressed or eliminated in the higher layers in which the lower ranked roads are not included. Using aggregated segments data records may enhance performance of some navigation functions. When these aggregated segments data records represent portions of roads that are associated with location reference numbers and the list 260(1) of segment ID's in a location reference record 260 includes only layer 0 segment ID's, the layer 0 segment data records that represent road segments that are included in aggregations of road segments that are represented in higher layers by aggregated segments data records may include references that identify the associated aggregated segments data records. Alternatively, the segment ID's of aggregated segments data records may be included in the list 260(1) of the location reference record.

In addition to the list of segment ID's associated with each location reference number, the location reference record 260 may identify other data entities 260(2) associated with the location represented by the location reference number. For example, the location reference record 260 may include a list of node ID's that represent the nodes associated with the location reference number.

The location reference number data record 260 may also include other data components. For example, the location reference number 260 includes a direction attribute 260(3). The location reference number 260 may also optionally include an intersection attribute 260(4). The direction attribute 260(3) indicates the direction of the location reference number. The intersection attribute 260(4), if provided, includes data that indicates the type of location represented by the location reference record. For example, the intersection attribute 260(4) may include data that indicates that the location identified by the location reference number is a ramped interchange, a terminus, or that the intersection includes stoplights, and so on. The location reference number data record 260 may also include other data 260(5).

D. Location Reference Record Organization in the Database

The data components of all the location records, such as the record shown in FIG. 11, are organized, arranged and stored in the geographic database 140 used by the navigation system in a manner that facilitates the rapid identification and retrieval of all associated segment records, given a location reference number and an extent. The organization, arrangement and storage of the location reference data are illustrated in connection with FIGS. 12 and 13.

As a preliminary step to locating the segment records in the geographic database which are associated with a location reference number, the location key 505 associated with the location reference number is used. As mentioned above, the location key is formed of the components of a traffic message that includes a location reference number. Then, in order to find the data records associated with each location reference key, a location key index 247(LR) is used. The location key index 247(LR) is formed and stored in or with the geographic database 140. This location key index 247(LR) may be located in a portion of the geographic database 140 separate from the location reference record data 245. Referring to FIG. 13, in a present embodiment, the location key index 247(LR) is included among the index files 247 (also shown in FIG. 6). By storing the location key index 247(LR) separately from the location reference record data 245, the entire location key index 247(LR) may be read into the memory of the navigation system and used to identify the location of the desired location reference record. Storing the location key index 247(LR) separately from the location reference data avoids the need to load unnecessary data into the memory of the navigation system thereby enhancing performance. Depending upon the memory resources of the navigation system, the location key index 247(LR) may be maintained in memory along with other indices included among the index files 247. Alternatively, the location key index 247(LR) may be loaded into memory and used only when needed. (If the size of the location key index 247(LR) is relatively large, it may be required to store it in more than one parcel.)

In the embodiment shown in FIG. 13, the location key index 247(LR) does not identify the location of each specific location reference record, but instead the location key index 247(LR) identifies the parcel 320(LR) of location reference data 245 that contains that desired location reference record. As shown in FIG. 13, the location key reference index 247(LR) includes a list 510 of entries. The entries in this list 510 include only those location reference keys 505 that correspond to the first location reference records in each of the plurality of parcels 320(LR) that contain location reference data 245. Each of the entries in the list 510 also includes an identification of the parcel of data that includes the location reference record that corresponds to the location key in the entry. This identification may be a pointer or other reference, or alternatively, the identification may be a parcel ID from which the location of the parcel in the database and/or on the medium can be determined.

The location reference keys 50 in the list 510 in the location key index 247(LR) are sorted and/or arranged in order (e.g., numerically smallest to largest, or vice versa). Therefore, the entries in the list 510 can be used to identify the parcel in which the location reference record associated with any location key is located. Given a location key, the list 510 can be traversed until an entry larger than the given location key is encountered. Then, the parcel that contains the location reference record associated with the given location key is the parcel referenced by the previous entry in the list. Alternatively, other searching techniques (e.g., binary searches) can be used to find the parcel that contains a desired location reference number. Thus, this list 510 accommodates searching techniques that allow finding the parcel that contains a location reference record quickly.

If the list 510 of entries in the location key index 247 would comprise more than one parcel, then a search tree may be constricted above this list to facilitate searching for the location key parcel by key. Thus, the location key index may comprise a multiple layer search tree, each layer of which may be binary searched by key for a location tree parcel at the next lower layer, or (from the lowest layer location index parcel) for a location reference record parcel.

Each of the parcels 320(LR) that contain location reference data 245 has a similar organization. The organization of a representative parcel 320(LR) (n) of location reference data 245 is shown in FIG. 12. Each parcel 320(LR) of location reference data includes a data component 521 that identifies the location reference record (e.g., by location key) that has the minimum location reference key within the parcel. This record corresponds to the record pointed to by the entry in the location key index 247(LR). The parcel of location reference data 245 also includes an offset table 545 and location reference records 550.

The offset table 545 includes a list of entries 546(1), 546(2), 546(3) . . . that correspond to each of the location reference records 550(1), 550(2) . . . 550(n), included in the parcel. The entries 546 in the list 545 reflect the ordering of the location reference records which in a present embodiment are numerically ordered. Each entry 546 identifies the length 547 of its corresponding location reference record in the parcel. The offset table 545 also includes, for each entry 546, data that identify the next location key 549. The data in the next location key 549 identify the location key 505 of the immediately next location reference number along the roadway relative to the location key of the entry 546. Similarly, each entry 546 includes data that identify the previous location key 551. The data in the previous location key 551 identify the location key of the immediately previous location reference number along the roadway relative to the position corresponding to the location key of the entry 546. For example, referring to the illustration in FIG. 9, an entry 546 in the offset table for the location key for the interchange associated with "LR12006" would identify the location key for LR12005 as its previous location key 551 and the location key for LR132297 as its next location key 549. As mentioned above, location reference numbers are not necessarily assigned consecutively along a roadway. Therefore, the next and previous location keys for each location reference number are identified in the offset table 545.

Following the offset table 545 in the parcel is the location reference record portion 550 of the location reference parcel 320(LR). The location reference record portion 550 includes the location records 550. Each location reference record 550 in the location reference parcel 320(LR) includes the components identified in FIG. 11. Specifically, each location reference record 550 includes a direction attribute (corresponding to the direction data 260(2) in FIG. 11) and a list of segment ID's (corresponding to the list 360(1) in FIG. 11). Optionally, the location reference record 550 may also include an intersection attribute (corresponding to the intersection data 260(3) in FIG. 11), E. Programming to Use Location Reference Data Another aspect of the present embodiment includes programming that uses both the data in the traffic messages 50 and the location reference data 245 in the geographic database 140. (This programming is referred to herein as "location reference programming" or "location reference routine" 145.) The location reference programming 145 may be included as part of the navigation application programming 118 (in FIG. 2) that is installed in and/or executed by the navigation system 110. Alternatively, the location reference programming 145 may be included as part of a software interface layer that resides between the navigation application functions (such as the routing function 141, the map display function 143, etc.) and the geographic database 140. The software interface layer may also be installed in and/or executed by the navigation system 110. If the location reference programming is installed in the navigation system 110 in the vehicle, it may be stored in a non-volatile computer-readable medium that is part of the navigation system.

FIG. 14 shows a flowchart that sets forth the major steps in the location reference programming 145. In the embodiment shown in FIG. 14, a receiver routine application 707, which may be part of the navigation application program 118, performs certain initial steps and then provides an output to the location reference programming 145. In an alternative embodiment, the steps performed by the receiver routine application 707 may be performed by the location reference programming 145.

In an initial step (Step 710), a single traffic message 50 is received. The traffic message 50 may have a format similar to that shown in FIG. 3. In the next step (Step 714), the traffic message 50 is parsed to obtain the components of the message 50, including the location reference number 51(1), the extent 50(4), and so on. These data are provided by the receiver routine application 707 to the location reference programming 145.

Using the location reference number 51(1), the country code 51(3), and the location table number 51(2) from the message, a location key 505 is formed (Step 718). The location key 505 may be formed by concatenating these components extracted from the traffic message. Using the location key 505 formed in the previous step, the location key index 247(LR) in the geographic database 140 is used to find the parcel 320(LR) of location reference data records that contains the location reference record associated with the location key (Step 722). Next, once the parcel of location reference records that contains the record associated with the location key is identified using the location key index 247(LR), the parcel is accessed and read (Step 726).

In reading the parcel 320(LR), the parcel header, including the offset table 545, is read first (Step 730). Using the offset table 545 (in which the location keys are numerically ordered), the entry corresponding to the desired location key is found (Step 734). From the entry in the offset table 545, either the next location key 548 or the previous location key 551 is read. Which of these keys (i.e., next or previous) is read depends on the direction data 50(3) in the traffic message, which defines the direction of traffic congestion relative from the position of the location reference number. Using the direction data 50(3) and the extent data 50(4) from the traffic message 50, in conjunction with either the next or previous location key from the offset table, each of the other location keys to which the traffic message applies can be determined (Step 738). The offset table may have to be used several times to identify all the location keys encompassed within an extent. For example, if the extent data 50(4) is "4," the offset table 545 is used first to identify the next (or previous, depending upon the direction) location key relative to the location key for the location reference number 51(2) identified in the message 50. Then, this next (or previous key) key is located in the offset table in order to identify its next (or previous location reference key). This process is continued until all four of the location keys (corresponding to the "4" identified in the extent data field 50(4) are identified. It may be necessary to access one or more additional parcels of location reference data records if the extent data field 50(3) identifies a string of location reference locations represented by location reference records in more than one parcel. In many cases however, the keys are repeated so that the number of parcels that needs to be read is kept to a minimum.

After all the location keys corresponding to the extent are identified, the offset table 545 is used to locate the desired location reference data records within the parcel (Step 742). For each location key entry in the offset table, the offset into the parcel identifies the location within the parcel at which the data associated with the location key entry is found. For each location key entry, the location reference data record 550 is read (Step 746). Specifically, all the segment ID's associated with each identified location key are identified. These segment ID's identify all the segments that are affected by the traffic congestion in the traffic message 50. These segment ID's may be associated with more than one location reference number because the extent data 50(4) may identify more than one location reference number as being affected by the traffic congestion. This list of segment ID's 752 is then returned (Step 750) to the program that called it.

Examples of how this location reference programming routine 145 can be used in the context of the navigation system are provided below.

The location reference programming 145 may return a list of segment ID's for one layer (e.g., routing layer 0), or alternatively, for more than one layer. In an embodiment in which the location reference records 260 include only the segment ID's associated with one layer, such as routing layer 0, these routing layer 0 data records may be accessed first and read to obtain the references included in these layer 0 segment data records to the data records in other, higher layers. Then, these additional segment ID's 759 may also be returned to the calling application. If the higher layers include aggregated segments data records, references to these records may also be returned. The steps (756 and 758) included in this optional alternative are illustrated by the dashed lines in FIG. 14.

The location reference programming 145 may be written in any suitable programming language. In one embodiment, the location reference programming 145 is written in the same programming language as the other functions that access and use the geographic database. In a present embodiment, the location reference programming 145 is written in C, although in alternative embodiments, the location reference programming 145 may be written in any suitable programming language, such as C++, Java, or programming languages that may be developed in the future.

F. Methods of Operation

According to the present embodiment, for a given type of location reference (such as the ALERT-C protocol in the RDS-TMC system) and one or more location references of that type, a means is provided for returning the entities corresponding to those references. For the RDS-TMC location reference type, the location reference would represent the RDS-TMC code, which is the collective encoding of the location attributes as noted above. The entities or records returned from the geographic database 141 would be segment data records Methods of using the embodiments are disclosed in the following examples.

EXAMPLE 1

This example is described in connection with FIG. 15. In the example of FIG. 15, traffic data are obtained at initialization of the navigation system and then updated continuously or at regular intervals during use of the navigation system. In FIG. 15, at or after the navigation system is started or initialized (Step 807), a traffic data collection program 810 is executed. This traffic data collection program 810 may be part of the navigation application programming 118, the interface layer programming (mentioned above), or any other part of the navigation system. The traffic data collection program 810 may work in the background so that it does not interfere with other tasks that the end-user may call on the navigation system to perform.

The traffic data collection program 810 begins to receive traffic message broadcasts 50. These may be received from the receiver 125 in FIG. 2. For each traffic message 50 received, the traffic data collection program 810 calls the location reference routine 145 (shown in FIG. 14) (Step 825). The traffic data collection program 810 may have to buffer the traffic messages 50 received from the traffic broadcast system 20 until the location reference routine 145 is able to catch up with the messages. A portion of the memory of the navigation system may be provided for this purpose.

For each traffic message 50, the location reference routine 145 returns a list of segment ID's that are affected by the congestion reported in the traffic message. The severity of the congestion from the traffic message is associated with the segments and stored in a temporary database 818 (Steps 827 and 829). The data collection program 810 continues to store data that associates severity with segment data records until all the traffic messages have been obtained (Step 830). At this point the data collection program continues to collect traffic messages and updates the temporary database as necessary as the severity associated with segments changes (Step 831).

At any time after all the traffic messages have been obtained, the temporary database 818 may be used by the navigation application. For example, when the route calculation function 141 is executed to determine a solution route 833, the temporary database 818 may be used in conjunction with the geographic database 140. The route calculation function examines segments from the geographic database 140 for the purpose of determining potential solution routes and determines whether any of the segments have severity ratings associated with them in the temporary database 818. If a segment in a potential solution route has a severity weighting associated with it in the temporary database 818, the weighting is taken into account when comparing the potential solution route to other potential solution routes. If traffic is severely congested on a segment of a potential solution route, another potential solution route may be selected.

In this example, the access performance of obtaining the segments associated with traffic messages is not critical because the traffic data collection process accumulates the list of segment entities to be avoided in the temporary database 818 prior to route calculation.

EXAMPLE 2

This example is described in connection with FIG. 16. In FIG. 16, traffic data 50 are not obtained until the route calculation program 141 is run. In FIG. 16, the route calculation program 141 receives input that includes a desired destination and an origin (Step 901). A traffic data collection program 903 is called. This traffic data collection program 903 obtains traffic messages 50 broadcast by the traffic broadcast system 20 (Step 905). Each of these traffic messages may be temporarily stored in a memory of the navigation system 110. The traffic messages 50 may be filtered so that messages that pertain to locations relatively far away from potential solution routes are not processed. Then, the traffic data collection program 903 executes a routine 907 for each pertinent traffic message.

For each traffic message 50, the routine 907 calls the location reference routine 145 (in FIG. 14) in order to obtain all the segment data entities (or at least the ID's for all the segment data entities) associated with the location reference number(s) in the traffic message including the location reference number explicitly specified in the traffic message as well as those location reference numbers which are implicitly specified by the extent data included in the traffic message. Using the listing 752 of segment data entities (or the ID's thereof), the severity of the traffic congestion included with the traffic message is associated with each of these segment data entities (or ID's) (at Step 913). This association of severity with segment ID's is stored in a temporary database 916 (at Step 915).

Once all the pertinent traffic messages are obtained, the route calculation function 141 proceeds to determine a solution route 921 (Step 917). In the process of determining a solution route, the temporary database 916 of weighted segments is used in conjunction with the geographic database 140. When a portion of a potential solution route being calculated by the route calculation function 141 includes one of the segments associated with a severity weighting in the temporary database 916, the weighting is taken into account when comparing the potential solution route to other potential solution routes. The severity weighting may indicate that the traffic congestion is so bad that the segment should be avoided entirely. Alternatively, the severity may be relatively light so that segments that include traffic congestion may still be used in a potential solution route.

G. Alternative Embodiments

In alternative embodiments, some or all of the navigation application programming or functions performed by the navigation system may be performed remotely. For example, some or all of the navigation application programming functions may be performed by a service provider to which the vehicle has a wireless communication link. (The service provider is not necessarily associated with the traffic broadcast system.) In such an alternative, the user's input may be transmitted to the remote service provider where the navigation function is performed and the result transmitted back to the vehicle. The location reference programming and/or the data collection programming may be located either in the vehicle or may be accessed remotely.

In another alternative, some or all of the geographic database 140 may be located remotely, with a service provider for example, and accessed by the navigation system in the vehicle via a wireless communication link. The location reference records may be located either on a computer readable medium in the vehicle or may be located remotely and accessed via a communications link.

In another alternative, some or all of the location referencing data may be downloaded as needed via a wireless communication link and stored in the vehicle on a separate, writable media located in the vehicle, or alternatively, the location reference data may be stored in a table in a memory (such as a RAM) in the vehicle. In this embodiment, the navigation programming in the vehicle that uses the location referencing data accesses the data from the separate medium. An advantage of this embodiment is that the location referencing data can be updated as needed. Another advantage is that new traffic message systems can be accommodated readily. To keep storage at a minimum the data could be read only for a limited geographic coverage area.

In a further alternative, a primary source of location referencing data can be stored with the geographic database and updates to the location referencing data can be downloaded and stored on a separate medium. In this embodiment, the programming that uses the location referencing data uses both the primary location reference data and the updated data.

Figure 17:
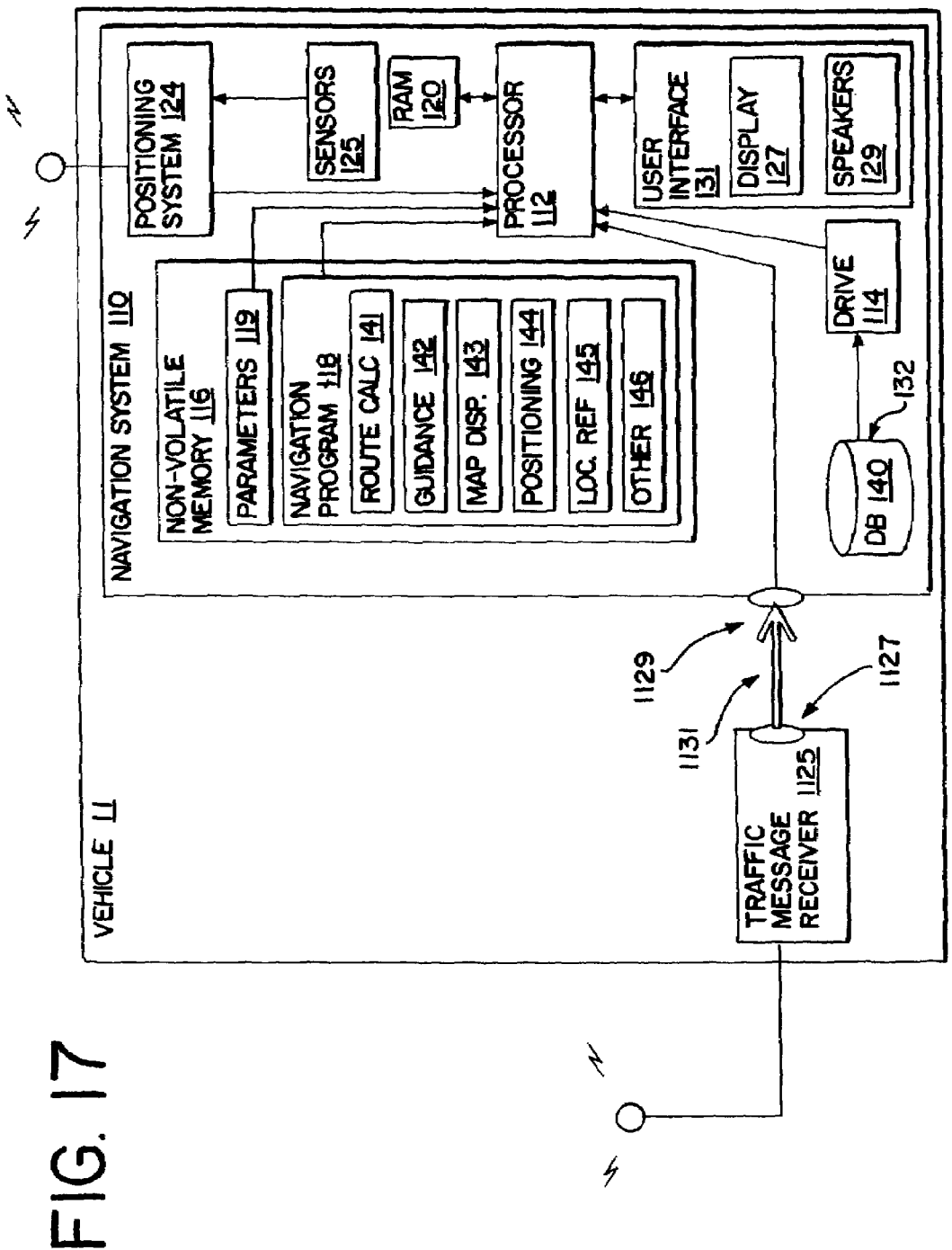
FIG. 17 is a block diagram illustrating an alternative embodiment for utilizing traffic message data with a navigation system.

In another alternative embodiment, the receiver that receives the traffic messages and provides the traffic messages to the programming that parses the traffic message may be part of the navigation system 110 (as shown at 125 in FIG. 2) or alternatively, the receiver may be a stand-alone unit or a unit associated with another kind of equipment. This alternative embodiment is shown at 1125 in FIG. 17. If the receiver is not part of the navigation system 110 as shown at 1125 in FIG. 17, the receiver 1125 has an output port 1127 that can be coupled to an input port 1129 on the navigation system 110 in order to allow the transfer of data, such as the traffic messages, from the receiver 1125 to the navigation system 110. The ports on the receiver and on the navigation system, 1127 and 1129, may provide for a direct connection or alternatively may provide for connection by cabling 1131. In other respects, the navigation system and the geographic database are similar or the same as in the previously described embodiments.

In alternative embodiments, the geographic database 141 may include location reference data that supports traffic broadcast messages from systems other than the RDS-TMC system. Examples of such other systems include GATS, VICS, and ITS Datum, as well as proprietary systems, and systems that may be developed in the future. Such other systems may include messages that are similar to the messages in the RDS-TMC system or may include different kinds of messages. These different kinds of messages may include a location referencing system, like the RDS-TMC system, or may include other kinds of location referencing. These different kinds of systems may include extent data that implicitly identify other locations, or alternatively all locations may be explicitly identified.

In another embodiment, the geographic database may include location reference data that supports more than one kind of traffic broadcast messaging format. For example, the RDS-TMC system as well as some other system may be supported. In some regions, there may be more than one kind of traffic broadcast system, each with its own kind of message format, location referencing numbers, and so on. Under these circumstances, the geographic database may include separate sets of location reference data records, each formed with separate location keys. These separate sets may be stored in the geographic database 141.

In a navigation system that supports more than one kind of traffic broadcast messaging format, or traffic broadcast systems in addition to the RDS-TMC system, the geographic database may support a query from the navigation application program to identify the kinds of real time traffic broadcast systems that are supported. The query returns an identification of the traffic broadcast systems whose location reference data are included in or supported by the geographic database. In these kinds of systems that support multiple traffic messaging formats, programming may also be provided in the navigation system that allows a selection of the traffic message format. The selection process may be automatic or alternatively, the selection process may be made by the end user. Support for multiple traffic broadcast formats may be useful for vehicles that travel to different cities that have different traffic broadcast system formats.

According to another alternative embodiment, location reference data entities may be used in the geographic database to utilize numbering references from systems other than those that broadcast traffic messages. For example, there are organizations or entities that provide services related to certain types or classes of points-of-interest. Examples of such organizations include ticket sellers who sell tickets to various events (e.g., theater, sports, music, movies, comedy, and so on) in a metropolitan area. Each of the venues for which tickets are available may be identified by the ticket seller by a reference number. According to this alternative embodiment, the geographic database includes location reference data entities that relate the reference numbers used by the ticket seller to data included in the geographic database. In this embodiment, each location reference data entity in the geographic database corresponds to one of the reference numbers used by the ticket seller to identify a venue. Each location reference data entity identifies a corresponding point-of-interest data entity record in the geographic database which corresponds to the location as the venue. The navigation application may use these kinds of location reference data entities in a manner similar to the way it uses traffic message information. The navigation application receives data from the ticket seller either directly or indirectly. The data may be received by wireless or non-wireless means of communication. The data from the ticket seller identifies venues by the identification numbers assigned by the ticket seller. The data may also include performance times, ticket availability, ticket prices, programs, and so on. The navigation application uses the location reference data entities to relate the information received from the ticket seller to the point of interest data entities in the geographic database. The user can then access the information received from the ticket seller in conjunction with use of the point-of-interest data in the geographic database. The user can use the data from the ticket seller as further criteria when searching the geographic database. For example, the user can search for theater performances within 25 miles and that start within the next 2 hours. Other kinds of systems to which the location reference number can be used include hotel chains, restaurant organizations, real estate brokers' offices, and so on.

It is intended that the foregoing detailed description be regarded as illustrative rather than limiting and that it is understood that the following claims including all equivalents are intended to define the scope of the invention.

We claim:

1. A method of forming a geographic database stored on a computer-readable medium wherein the geographic database includes data that represent individual segments of roads and that can be used in a navigation system that also uses traffic messages broadcast by a traffic broadcast system that identify locations along roadways with location reference numbers wherein each of said traffic messages includes a location reference number that indicates a starting location of a reported traffic condition, wherein said location reference number identifies a designated location selected from an ordered sequence of designated locations along a road to which location reference numbers have been assigned, and data that indicates a physical distance that the reported traffic condition extends as an extent of the reported traffic condition, wherein said extent is expressed as a number of adjacent locations in said ordered sequence of designated locations extending from the starting location, the method comprising the steps of:

storing in the geographic database on the computer-readable medium data that represent each individual road segment located in a region; and storing in the geographic database data that represent each location reference number, wherein the data that represent each location reference number identify the road segment upon which the designated location identified by said location reference number is located, the road segments leading to the road segment upon which the designated location identified by the location reference number is located, the immediately previous location reference number in said ordered sequence, and the immediately next location reference number in said ordered sequence, whereby the navigation system accesses the data in the geographic database stored on the computer-readable medium to relate the data contained in the traffic messages to road segments represented in the geographic database in order to use said traffic messages in said navigation system.

2. The invention of claim 1 wherein said data that represent each individual road segment located in a region are organized into a plurality of parcels each of which includes a plurality of data records that represent individual road segments.

3. The invention of claim 1 further comprising:
   an index that relates location reference numbers with road segments.

4. The invention of claim 1 wherein said geographic database is comprised of separate types of geographic data.

5. The invention of claim 4 wherein said separate types of geographic data include routing and cartographic.

6. The invention of claim 1 wherein said geographic database is stored on a computer readable medium.

7. The invention of claim 1 wherein said traffic messages are broadcast on the Radio Data System-Traffic Message Channel.

8. The invention of claim 1 wherein said traffic messages conform to a standard format for ALERT-C messages established in the RDS-TMC system.

9. A method of operating a navigation application program that uses a geographic database that includes
   data entities that represent geographic features in a geographic area and further that includes
   traffic message location reference data of a first type that can be used with a respective first type of traffic message broadcast system and traffic message location reference data of a second type that can be used with a respective second type of traffic message broadcast system,
   wherein each of said traffic messages received from the first type of traffic message broadcast system includes
   data that indicates a starting location of a reported traffic condition, wherein said starting location is a location selected from an ordered sequence of designated locations along a road to which location reference numbers have been assigned, and
   data that indicates an extent of the reported traffic condition, wherein said extent is expressed as a number of adjacent locations in said ordered sequence of designated locations extending from the starting location, the method comprising the steps of:
   selecting one of said first type of traffic broadcast system and said second type of said traffic message broadcast system;
   receiving traffic messages broadcast by the traffic message broadcast system of said selected type; and
   using said location reference data in said geographic database that corresponds to said selected type to associate data in said traffic messages received from said traffic message broadcast system to said data entities that represent geographic features in a geographic area in said geographic database.

10. The method of claim 9 further comprising:
    an index that relates said location reference data with road segments.

11. The method of claim 9 wherein said geographic database is stored on a computer readable medium.

12. The method of claim 9 wherein said traffic messages from the first type of traffic message broadcast system are broadcast on the Radio Data System-Traffic Message Channel.

13. The method of claim 9 wherein said traffic messages from the first type of traffic message broadcast system conform to a standard format for ALERT-C messages established in the RDS-TMC system.

14. A geographic database used by a navigation system for route calculation in conjunction with traffic messages broadcast by either of two traffic condition broadcast systems, wherein each of said traffic messages from at least one of said traffic condition broadcast systems includes
- a location reference number that indicates a starting location of a reported traffic condition, wherein said location reference number identifies a designated location selected from an ordered sequence of designated locations along a road to which location reference numbers have been assigned, and
- data that indicates an extent of the reported traffic condition, wherein said extent is expressed as a number of adjacent locations in said ordered sequence of designated locations extending from the starting location, said geographic database comprising:
- data entities of a first type that represent geographic features in a geographic region, including portions of a road network;
- data entities of a second type each of which associates a location reference number assigned by one of the two traffic condition broadcast systems to a road segment upon which the designated location assigned to the location reference number has been assigned; and
- data entities of a third type each of which associates a location reference number assigned by the other of the two traffic condition broadcast systems to a road segment upon which a designated location assigned to the location reference number has been assigned,
- whereby the navigation system using said geographic database in conjunction with traffic messages broadcast by either of the two traffic condition broadcast systems can incorporate information from said traffic messages when using said geographic database for route calculation purposes.

15. The invention of claim 14 further comprising:
an index that relates location reference numbers with road segments.

16. The invention of claim 14 wherein said geographic database is comprised of separate types of geographic data.

17. The invention of claim 16 wherein said separate types of geographic data include routing and cartographic.

18. The invention of claim 14 wherein said geographic database is stored on a computer readable medium.

19. The invention of claim 14 wherein said a traffic messages from the first type of traffic message broadcast system are broadcast on the Radio Data System-Traffic Message Channel.

20. The invention of claim 14 wherein said traffic messages from the first type of traffic message broadcast system conform to a standard format for ALERT-C messages established in the RDS-TMC system.

* * * * *